US009631627B2

(12) United States Patent
Avedon

(10) Patent No.: US 9,631,627 B2
(45) Date of Patent: Apr. 25, 2017

(54) COLUMNAR AIR MOVING DEVICES, SYSTEMS AND METHODS

(71) Applicant: AIRIUS IP HOLDINGS, LLC, Longmont, CO (US)

(72) Inventor: Raymond B. Avedon, Boulder, CO (US)

(73) Assignee: AIRIUS IP HOLDINGS, LLC, Longmont, CO (US)

( * ) Notice: Subject to any disclaimer, the term of this patent is extended or adjusted under 35 U.S.C. 154(b) by 64 days.

(21) Appl. No.: 15/061,951

(22) Filed: Mar. 4, 2016

(65) Prior Publication Data

US 2016/0186765 A1  Jun. 30, 2016

Related U.S. Application Data

(63) Continuation of application No. 13/365,223, filed on Feb. 2, 2012, now abandoned, which is a
(Continued)

(51) Int. Cl.
*F04D 25/08* (2006.01)
*F04D 25/12* (2006.01)
(Continued)

(52) U.S. Cl.
CPC ............ *F04D 25/088* (2013.01); *B23P 19/00* (2013.01); *F04D 13/0613* (2013.01);
(Continued)

(58) Field of Classification Search
CPC ....................................................... F04D 25/08
(Continued)

(56) References Cited

U.S. PATENT DOCUMENTS 866,292 A * 9/1907 Meston ................. F04D 25/088
362/406
917,206 A   4/1909 Watts
(Continued)

FOREIGN PATENT DOCUMENTS

CN         1426729     7/2003
CN     10 1592328    12/2009
(Continued)

*Primary Examiner* — Steven B McAllister
*Assistant Examiner* — Samantha Miller
(74) *Attorney, Agent, or Firm* — Knobbe Martens Olson & Bear, LLP

(57) ABSTRACT

Air moving device includes a housing, an impeller in the housing for generating a downward air flow, and vanes in the housing in close proximity to and a selected distance below the impeller to straighten the air flow. The device produces an air flow that substantially remains in a column over a substantial distance. The method includes producing an air flow that substantially remains in a column over a substantial distance and directing the air flow from the ceiling towards the floor to provide temperature destratification of the air in an enclosed space. The method also includes directing warm air from the ceiling to the floor and storing heat in the floor, apparatus on the floor and ground under the floor. The stored heat is released when the ceiling is cooler than the floor.

20 Claims, 15 Drawing Sheets

Related U.S. Application Data continuation-in-part of application No. 12/130,909, filed on May 30, 2008, now abandoned, which is a continuation of application No. 11/027,039, filed on Dec. 30, 2004, now Pat. No. 7,381,129.

(60) Provisional application No. 60/553,720, filed on Mar. 15, 2004, provisional application No. 61/521,270, filed on Aug. 8, 2011.

(51) Int. Cl.
    *F04D 29/54* (2006.01)
    *F04D 29/60* (2006.01)
    *F24F 7/007* (2006.01)
    *B23P 19/00* (2006.01)
    *F04D 13/06* (2006.01)
    *F04D 29/52* (2006.01)
    *F21V 33/00* (2006.01)

(52) U.S. Cl.
    CPC .......... *F04D 25/12* (2013.01); *F04D 29/522* (2013.01); *F04D 29/547* (2013.01); *F04D 29/601* (2013.01); *F21V 33/0096* (2013.01); *F24F 7/007* (2013.01); *F24F 2221/02* (2013.01); *F24F 2221/14* (2013.01)

(58) Field of Classification Search
    USPC ........................................................ 454/230
    See application file for complete search history.

(56) References Cited

U.S. PATENT DOCUMENTS

| | | |
|---|---|---|
| 1,858,067 A | 5/1932 | Warren |
| 1,877,347 A | 9/1932 | McCurdie |
| 1,926,795 A | 9/1933 | Sassenberg |
| 2,016,778 A | 10/1935 | Hall et al. |
| 2,189,008 A | 2/1940 | Kurth |
| 2,189,502 A | 2/1940 | Johnston |
| 2,232,573 A | 2/1941 | Teves |
| 2,258,731 A | 10/1941 | Blumenthal |
| 2,359,021 A | 9/1944 | Campbell et al. |
| 2,366,773 A | 1/1945 | Eklund et al. |
| 2,371,821 A | 3/1945 | Havis |
| D152,397 S | 1/1949 | Damond |
| 2,513,463 A | 7/1950 | Eklund et al. |
| 2,524,974 A | 10/1950 | Hickmott |
| 2,615,620 A | 10/1952 | Goettl |
| 2,632,375 A | 3/1953 | Stair et al. |
| 2,658,719 A | 11/1953 | Johanson |
| 2,830,523 A | 4/1958 | Vehige |
| 2,982,198 A | 5/1961 | Mohrman |
| 3,012,494 A | 12/1961 | Drummond |
| 3,036,509 A | 5/1962 | Babbitt |
| 3,068,341 A | 12/1962 | Ortiz et al. |
| D195,287 S | 5/1963 | Downing |
| 3,099,949 A | 8/1963 | Davidson |
| 3,165,294 A | 1/1965 | Anderson |
| 3,188,007 A | 6/1965 | Myklebust |
| 3,212,425 A | 10/1965 | Lindner et al. |
| 3,246,699 A | 4/1966 | Jocz |
| 3,300,123 A | 1/1967 | Freyholdt et al. |
| 3,320,869 A | 5/1967 | Schach |
| 3,364,839 A | 1/1968 | Sweeney et al. |
| 3,382,791 A | 5/1968 | Henry-Biabaud |
| 3,386,368 A | 6/1968 | Fielding |
| 3,413,905 A | 12/1968 | Johnson |
| 3,524,399 A | 8/1970 | Bohanon |
| 3,584,968 A | 6/1971 | Keith |
| 3,601,184 A | 8/1971 | Hauville |
| 3,690,244 A | 9/1972 | Kallel et al. |
| 3,699,872 A | 10/1972 | Kruger |
| 3,765,317 A | 10/1973 | Lowe |
| 3,785,271 A | 1/1974 | Joy |
| 3,827,342 A | 8/1974 | Hughes |
| 3,835,759 A | 9/1974 | LLoyd |
| 3,876,331 A | 4/1975 | DenHerder et al. |
| 3,927,300 A | 12/1975 | Wada et al. |
| 3,932,054 A | 1/1976 | McKelvey |
| 3,934,494 A | 1/1976 | Butler |
| 3,967,927 A | 7/1976 | Patterson |
| 3,973,479 A | 8/1976 | Whiteley |
| 3,988,973 A | 11/1976 | Honmann |
| 4,006,673 A | 2/1977 | Meyer et al. |
| 4,152,973 A | 5/1979 | Peterson |
| 4,185,545 A | 1/1980 | Rusth et al. |
| D256,273 S | 8/1980 | Townsend et al. |
| 4,261,255 A | 4/1981 | Anderson et al. |
| 4,321,659 A | 3/1982 | Wheeler |
| 4,344,112 A | 8/1982 | Brown |
| 4,396,352 A | 8/1983 | Pearce |
| 4,473,000 A | 9/1984 | Perkins |
| 4,512,242 A | 4/1985 | Bohanon, Sr. |
| 4,515,538 A * | 5/1985 | Shih ...................... F04D 25/10 248/343 |
| 4,522,255 A | 6/1985 | Baker |
| 4,524,679 A | 6/1985 | Lyons |
| 4,546,420 A | 10/1985 | Wheeler et al. |
| 4,548,548 A | 10/1985 | Gray, III |
| 4,550,649 A | 11/1985 | Zambolin |
| 4,630,182 A | 12/1986 | Moroi et al. |
| 4,662,912 A | 5/1987 | Perkins |
| 4,678,410 A | 7/1987 | Kullen |
| 4,681,024 A | 7/1987 | Ivey |
| 4,715,784 A | 12/1987 | Mosiewicz |
| 4,716,818 A | 1/1988 | Brown |
| 4,730,551 A | 3/1988 | Peludat |
| 4,790,863 A | 12/1988 | Nobiraki et al. |
| 4,794,851 A | 1/1989 | Kurrle |
| 4,796,343 A | 1/1989 | Wing |
| 4,848,669 A | 7/1989 | George |
| 4,850,265 A | 7/1989 | Raisanen |
| 4,890,547 A | 1/1990 | Wagner et al. |
| 4,895,065 A | 1/1990 | Lamparter |
| D308,416 S | 6/1990 | Brumbach |
| 4,930,987 A | 6/1990 | Stahl |
| 4,971,143 A | 11/1990 | Hogan |
| 4,973,016 A | 11/1990 | Hertenstein |
| 5,000,081 A | 3/1991 | Gilmer |
| 5,021,932 A | 6/1991 | Ivey |
| 5,033,711 A | 7/1991 | Gregorich et al. |
| 5,042,366 A | 8/1991 | Panetski et al. |
| 5,078,574 A | 1/1992 | Olsen |
| D325,628 S | 4/1992 | Cho |
| 5,107,755 A | 4/1992 | Leban et al. |
| 5,121,675 A | 6/1992 | Muller et al. |
| 5,127,876 A | 7/1992 | Howe et al. |
| 5,152,606 A | 10/1992 | Borraccia et al. |
| 5,156,568 A | 10/1992 | Ricci |
| 5,191,618 A | 3/1993 | Hisey |
| D340,765 S | 10/1993 | Joss et al. |
| 5,251,461 A | 10/1993 | Fallows, III et al. |
| 5,328,152 A | 7/1994 | Castle |
| 5,358,443 A | 10/1994 | Mitchell et al. |
| 5,399,119 A | 3/1995 | Birk et al. |
| 5,429,481 A | 7/1995 | Liu |
| 5,439,352 A | 8/1995 | Line |
| 5,443,625 A | 8/1995 | Schaffhausen |
| 5,458,505 A | 10/1995 | Prager |
| 5,462,484 A | 10/1995 | Jung et al. |
| 5,511,942 A | 4/1996 | Meier |
| 5,513,953 A | 5/1996 | Hansen |
| 5,520,515 A | 5/1996 | Bailey et al. |
| 5,545,241 A * | 8/1996 | Vanderauwera ... B01D 46/0004 55/490 |
| 5,547,343 A | 8/1996 | Jané et al. |
| 5,551,841 A * | 9/1996 | Kamada ................ F04D 29/667 415/182.1 |
| 5,561,952 A | 10/1996 | Damron |
| 5,569,019 A | 10/1996 | Katariya et al. |
| 5,584,656 A | 12/1996 | Rose |
| 5,595,068 A | 1/1997 | Amr |
| 5,613,833 A | 3/1997 | Wolfe et al. |

(56) References Cited

U.S. PATENT DOCUMENTS

| | | | |
|---|---|---|---|
| 5,658,196 A | 8/1997 | Swaim | |
| 5,664,872 A | 9/1997 | Spearman et al. | |
| 5,709,458 A | 1/1998 | Metz | |
| 5,725,356 A | 3/1998 | Carter | |
| 5,791,985 A | 8/1998 | Schiedegger et al. | |
| 5,918,972 A | 7/1999 | Van Belle | |
| 5,934,783 A | 8/1999 | Yoshikawa | |
| D414,550 S | 9/1999 | Bloom | |
| 5,947,816 A | 9/1999 | Schiedegger et al. | |
| 5,967,891 A | 10/1999 | Riley et al. | |
| 5,997,253 A | 12/1999 | Fechan | |
| 6,004,097 A | 12/1999 | Wark et al. | |
| 6,068,385 A | 5/2000 | Hsieh | |
| 6,095,671 A | 8/2000 | Hutain | |
| 6,109,874 A | 8/2000 | Steiner | |
| 6,145,798 A | 11/2000 | Janisse et al. | |
| 6,149,513 A | 11/2000 | Lyu | |
| 6,155,782 A | 12/2000 | Hsu | |
| 6,168,517 B1 | 1/2001 | Cook | |
| 6,176,680 B1 | 1/2001 | Ringblom et al. | |
| 6,183,203 B1 | 2/2001 | Grintz | |
| 6,192,702 B1 | 2/2001 | Shimogori | |
| 6,196,915 B1 | 3/2001 | Schiedegger et al. | |
| 6,319,304 B1* | 11/2001 | Moredock | B01D 45/12 55/385.3 |
| 6,352,473 B1 | 3/2002 | Clark | |
| 6,360,816 B1 | 3/2002 | Wagner | |
| 6,361,428 B1 | 3/2002 | Tosconi et al. | |
| 6,361,431 B1 | 3/2002 | Kawano | |
| 6,364,760 B1 | 4/2002 | Rooney | |
| 6,383,072 B2 | 5/2002 | Schiedegger et al. | |
| 6,384,494 B1 | 5/2002 | Avidano et al. | |
| 6,386,828 B1 | 5/2002 | Davis et al. | |
| 6,386,970 B1 | 5/2002 | Vernier, II et al. | |
| 6,386,972 B1 | 5/2002 | Schiedegger et al. | |
| 6,435,964 B1 | 8/2002 | Chang | |
| 6,451,080 B1* | 9/2002 | Rocklitz | B01D 45/14 55/404 |
| 6,458,028 B2 | 10/2002 | Snyder | |
| 6,458,628 B1 | 10/2002 | Distefano et al. | |
| 6,484,524 B1 | 11/2002 | Ulanov | |
| 6,551,185 B1 | 4/2003 | Miyake et al. | |
| 6,575,011 B1 | 6/2003 | Busby et al. | |
| 6,581,974 B1 | 6/2003 | Ragner et al. | |
| 6,582,291 B2 | 6/2003 | Clark | |
| 6,592,328 B1 | 7/2003 | Cahill | |
| 6,595,747 B2 | 7/2003 | Bos | |
| 6,626,003 B1 | 9/2003 | Kortüm et al. | |
| 6,626,636 B2 | 9/2003 | Bohn | |
| D481,101 S* | 10/2003 | Boehrs | D23/209 |
| 6,648,752 B2 | 11/2003 | Vernier, II et al. | |
| 6,679,433 B2 | 1/2004 | Gordon et al. | |
| 6,682,308 B1 | 1/2004 | Fei et al. | |
| 6,700,266 B2 | 3/2004 | Winkel et al. | |
| 6,767,281 B2 | 7/2004 | McKee | |
| 6,783,578 B2 | 8/2004 | Tillman, Jr. | |
| 6,804,627 B1 | 10/2004 | Marokhovsky et al. | |
| 6,805,627 B2 | 10/2004 | Marts et al. | |
| 6,812,849 B1 | 11/2004 | Ancel | |
| 6,886,270 B2 | 5/2005 | Gilmer | |
| 6,916,240 B1 | 7/2005 | Morton | |
| 6,938,631 B2 | 9/2005 | Gridley | |
| 6,951,081 B2 | 10/2005 | Bonshor | |
| 6,966,830 B2 | 11/2005 | Hurlstone et al. | |
| 6,974,381 B1 | 12/2005 | Walker et al. | |
| D514,688 S | 2/2006 | Avedon | |
| 7,011,578 B1 | 3/2006 | Core | |
| 7,044,849 B2 | 5/2006 | Dippel | |
| 7,048,499 B2 | 5/2006 | Mathson et al. | |
| 7,056,092 B2 | 6/2006 | Stahl | |
| 7,056,368 B2* | 6/2006 | Moredock | B01D 45/14 55/385.3 |
| 7,101,064 B2 | 9/2006 | Ancel | |
| 7,152,425 B2 | 12/2006 | Han et al. | |
| 7,166,023 B2 | 1/2007 | Haigh et al. | |
| 7,175,309 B2 | 2/2007 | Craw et al. | |
| 7,185,504 B2 | 3/2007 | Kasai et al. | |
| 7,201,110 B1 | 4/2007 | Pawlak | |
| 7,201,650 B2 | 4/2007 | Demerath et al. | |
| 7,214,035 B2 | 5/2007 | Bussieres et al. | |
| 7,288,023 B2 | 10/2007 | Leopold | |
| 7,320,636 B2 | 1/2008 | Seliger et al. | |
| 7,331,764 B1 | 2/2008 | Reynolds et al. | |
| 7,374,408 B2 | 5/2008 | Savage et al. | |
| 7,381,129 B2 | 6/2008 | Avedon | |
| 7,467,931 B2 | 12/2008 | O'Toole | |
| 7,497,773 B1 | 3/2009 | Schmidt | |
| 7,516,578 B2 | 4/2009 | Bonshor | |
| 7,544,124 B2 | 6/2009 | Polston | |
| 7,549,258 B2 | 6/2009 | Lajewski | |
| 7,566,034 B2 | 7/2009 | Bonshor | |
| 7,607,935 B2 | 10/2009 | Dahl | |
| 7,610,726 B2 | 11/2009 | Lajewski | |
| 7,645,188 B1 | 1/2010 | Peerbolt | |
| 7,651,390 B1 | 1/2010 | Profeta et al. | |
| 7,677,770 B2 | 3/2010 | Mazzochette | |
| 7,677,964 B1 | 3/2010 | Bucher et al. | |
| 7,708,625 B2 | 5/2010 | Leseman et al. | |
| 7,752,814 B2 | 7/2010 | Bonshor | |
| 7,774,999 B2 | 8/2010 | McKee | |
| 7,780,510 B2 | 8/2010 | Polston | |
| D631,148 S | 1/2011 | Benton et al. | |
| 7,901,278 B2 | 3/2011 | O'Hagin | |
| 7,930,858 B2 | 4/2011 | Lajewski | |
| 8,052,386 B1 | 11/2011 | Fitzpatrick et al. | |
| D672,863 S | 12/2012 | Romero Carreras | |
| D681,184 S | 4/2013 | Romero Carreras | |
| 8,529,324 B2* | 9/2013 | Moredock | B60H 1/00264 454/155 |
| 8,596,596 B2 | 12/2013 | Naji et al. | |
| 8,616,842 B2 | 12/2013 | Avedon | |
| D698,916 S | 2/2014 | Avedon | |
| 8,967,983 B2 | 3/2015 | Kampf | |
| 8,992,174 B2 | 3/2015 | Chang | |
| 9,151,295 B2 | 10/2015 | Avedon | |
| D746,971 S | 1/2016 | Avedon | |
| 2001/0049927 A1 | 12/2001 | Toepel | |
| 2002/0045420 A1 | 4/2002 | Taillon | |
| 2002/0137454 A1 | 9/2002 | Baker | |
| 2004/0050077 A1 | 3/2004 | Kasai et al. | |
| 2004/0052641 A1 | 3/2004 | Chen | |
| 2004/0240214 A1 | 12/2004 | Whitlow et al. | |
| 2004/0253095 A1 | 12/2004 | Sasaki et al. | |
| 2005/0092888 A1 | 5/2005 | Gonce | |
| 2005/0159101 A1 | 7/2005 | Hrdina et al. | |
| 2005/0202776 A1 | 9/2005 | Avedon | |
| 2006/0087810 A1* | 4/2006 | Rockenfeller | G06F 1/20 361/679.47 |
| 2006/0172688 A1 | 8/2006 | Johnson | |
| 2006/0276123 A1 | 12/2006 | Sanagi et al. | |
| 2006/0284435 A1* | 12/2006 | Vitito | B60N 2/5635 296/1.07 |
| 2007/0213003 A1 | 9/2007 | Railkar et al. | |
| 2007/0297906 A1 | 12/2007 | Wu | |
| 2008/0019836 A1 | 1/2008 | Butz et al. | |
| 2008/0188175 A1 | 8/2008 | Wilkins | |
| 2008/0227381 A1 | 9/2008 | Avedon | |
| 2009/0041580 A1 | 2/2009 | Wichmann et al. | |
| 2009/0155080 A1 | 6/2009 | Yu | |
| 2009/0170421 A1 | 7/2009 | Adrian et al. | |
| 2009/0219727 A1 | 9/2009 | Weaver | |
| 2009/0262550 A1 | 10/2009 | Inoue | |
| 2010/0009621 A1 | 1/2010 | Hsieh | |
| 2010/0052495 A1 | 3/2010 | Liu et al. | |
| 2010/0176706 A1 | 7/2010 | Fu et al. | |
| 2010/0192611 A1 | 8/2010 | Yamaguchi et al. | |
| 2010/0266400 A1* | 10/2010 | Avedon | F04D 29/542 415/209.3 |
| 2011/0037368 A1 | 2/2011 | Huang | |
| 2011/0057551 A1 | 3/2011 | Lee et al. | |
| 2011/0057552 A1 | 3/2011 | Weaver | |
| 2011/0080096 A1 | 4/2011 | Dudik et al. | |
| 2011/0084586 A1 | 4/2011 | Lain et al. | |
| 2011/0133622 A1 | 6/2011 | Mo et al. | |

(56) References Cited

U.S. PATENT DOCUMENTS

| | | |
|---|---|---|
| 2011/0140588 A1 | 6/2011 | Chen |
| 2012/0195749 A1 | 8/2012 | Avedon |
| 2013/0011254 A1 | 1/2013 | Avedon |
| 2013/0023195 A1 | 1/2013 | Avedon |
| 2013/0027950 A1 | 1/2013 | Avedon |
| 2013/0196588 A1 | 8/2013 | Liao |
| 2014/0314560 A1 | 10/2014 | Avedon |
| 2015/0176834 A1 | 6/2015 | Avedon |
| 2015/0176851 A1 | 6/2015 | Avedon |
| 2015/0354578 A1 | 12/2015 | Avedon |

FOREIGN PATENT DOCUMENTS

| | | |
|---|---|---|
| CN | 201 560 963 | 8/2010 |
| DE | 44 13 542 | 10/1995 |
| DE | 196 38 518 | 4/1998 |
| DE | 10 2008 044874 | 3/2010 |
| EP | 0 037 958 | 10/1981 |
| EP | 0 212 749 | 3/1987 |
| EP | 0 772 007 | 5/1997 |
| EP | 2 248 692 | 11/2010 |
| FR | 0 715 101 | 11/1931 |
| FR | 2 784 423 | 4/2000 |
| GB | 0 824 390 | 11/1959 |
| GB | 0 981 188 | 1/1965 |
| GB | 2 344 619 | 6/2000 |
| GB | 2 468 504 | 9/2010 |
| JP | 55-032965 | 3/1980 |
| JP | 61-502267 | 10/1986 |
| JP | 07-167097 | 7/1995 |
| JP | 07-253231 | 10/1995 |
| JP | 08-219939 | 8/1996 |
| JP | 11-132543 | 5/1999 |
| JP | 2001-193979 | 7/2001 |
| JP | 2002-349489 | 12/2002 |
| JP | 2006-350237 | 12/2006 |
| JP | 2010-181124 | 8/2010 |
| KR | 20-0176664 | 4/2000 |
| KR | 2003-0025428 | 3/2003 |
| KR | 10-1255739 | 4/2013 |
| RU | 2400254 C2 | 9/2010 |
| TW | M337636 | 8/2008 |
| WO | WO 01/34983 | 5/2001 |
| WO | WO 2005/091896 | 10/2005 |
| WO | WO 2006/078102 | 7/2006 |
| WO | WO 2008/062319 | 5/2008 |
| WO | WO 2010/046536 | 4/2010 |
| WO | WO 2010/114702 | 10/2010 |
| WO | WO 2011/067430 | 6/2011 |
| WO | WO 2012/174155 | 12/2012 |
| WO | WO 2012/174156 | 12/2012 |
| WO | WO 2015/187856 | 12/2015 |

* cited by examiner

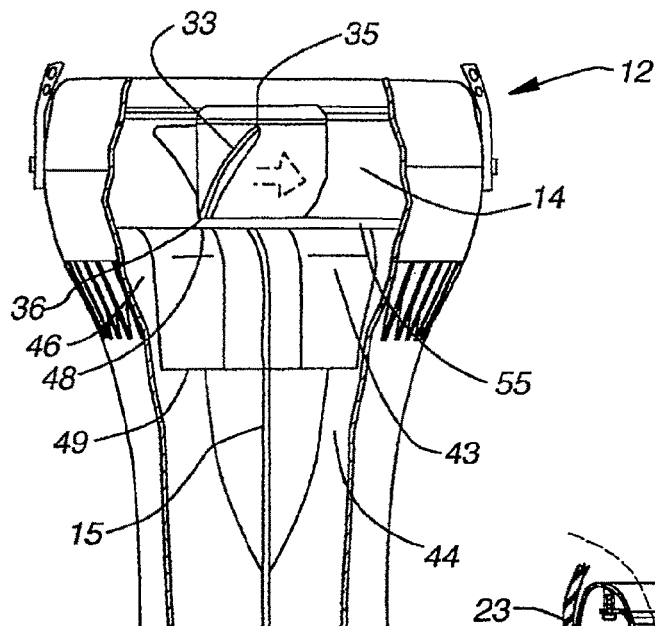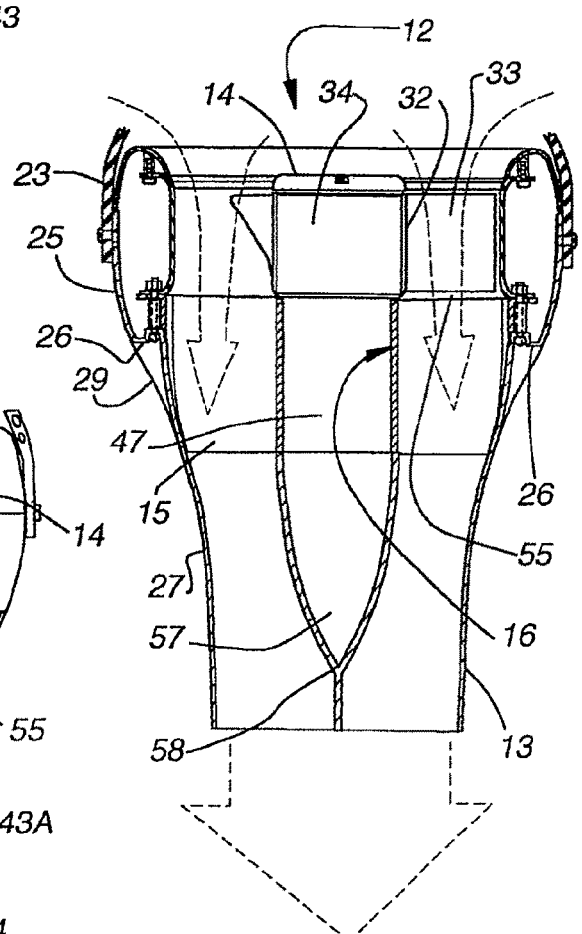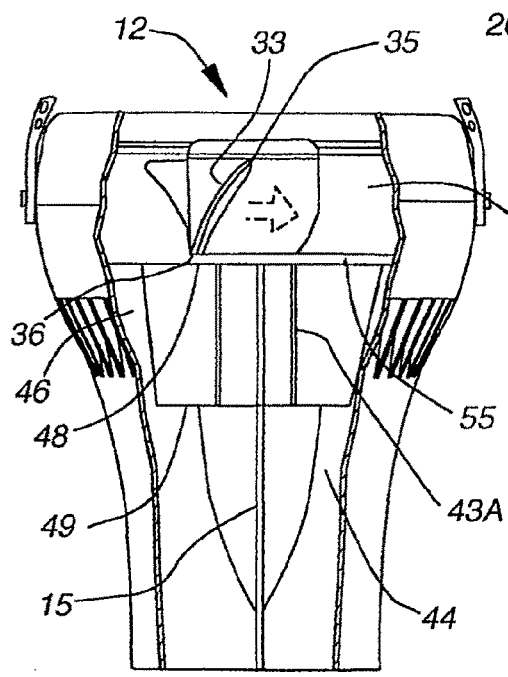

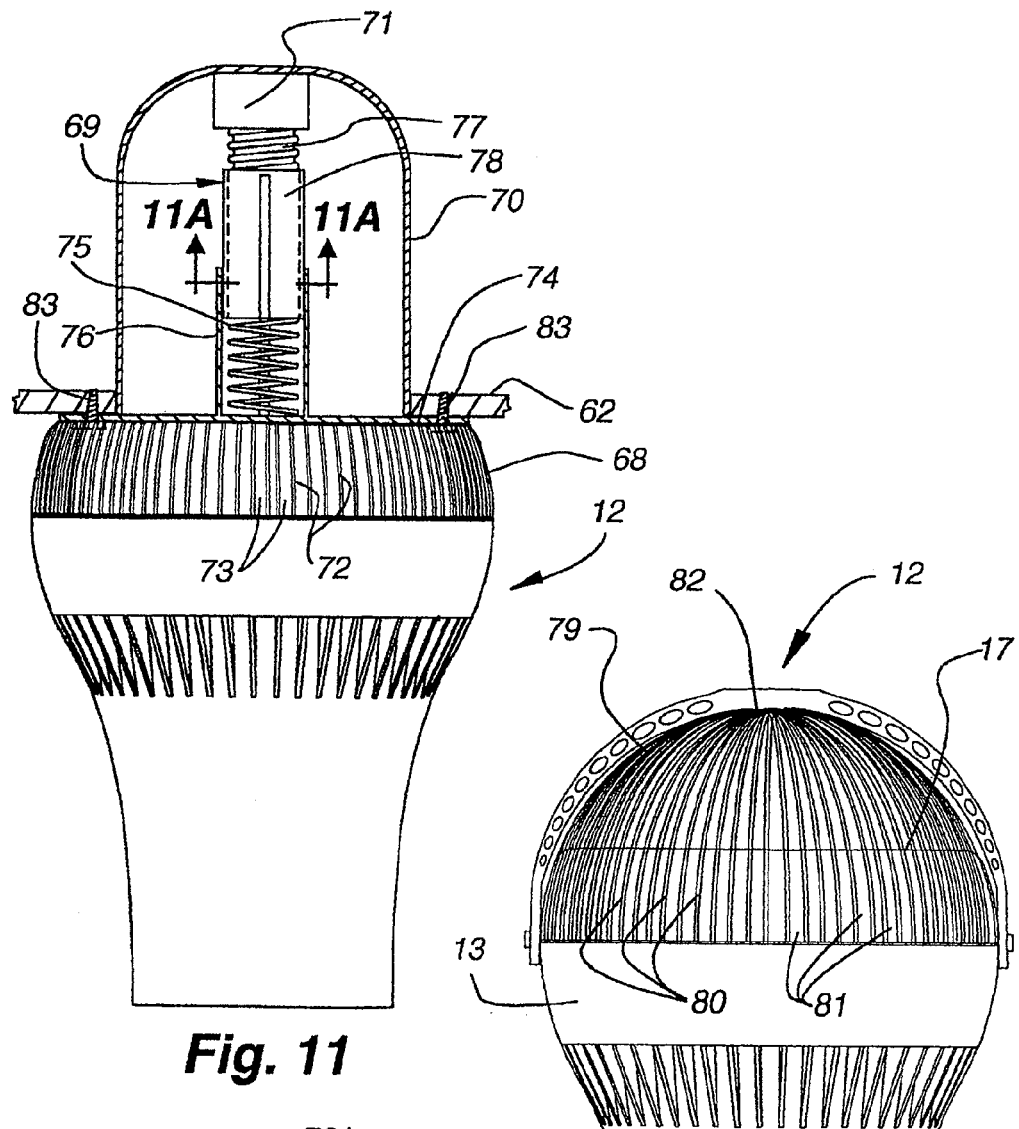
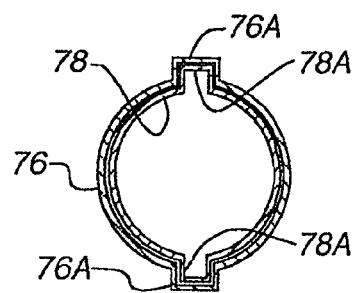
Fig. 11
Fig. 11A
Fig. 12

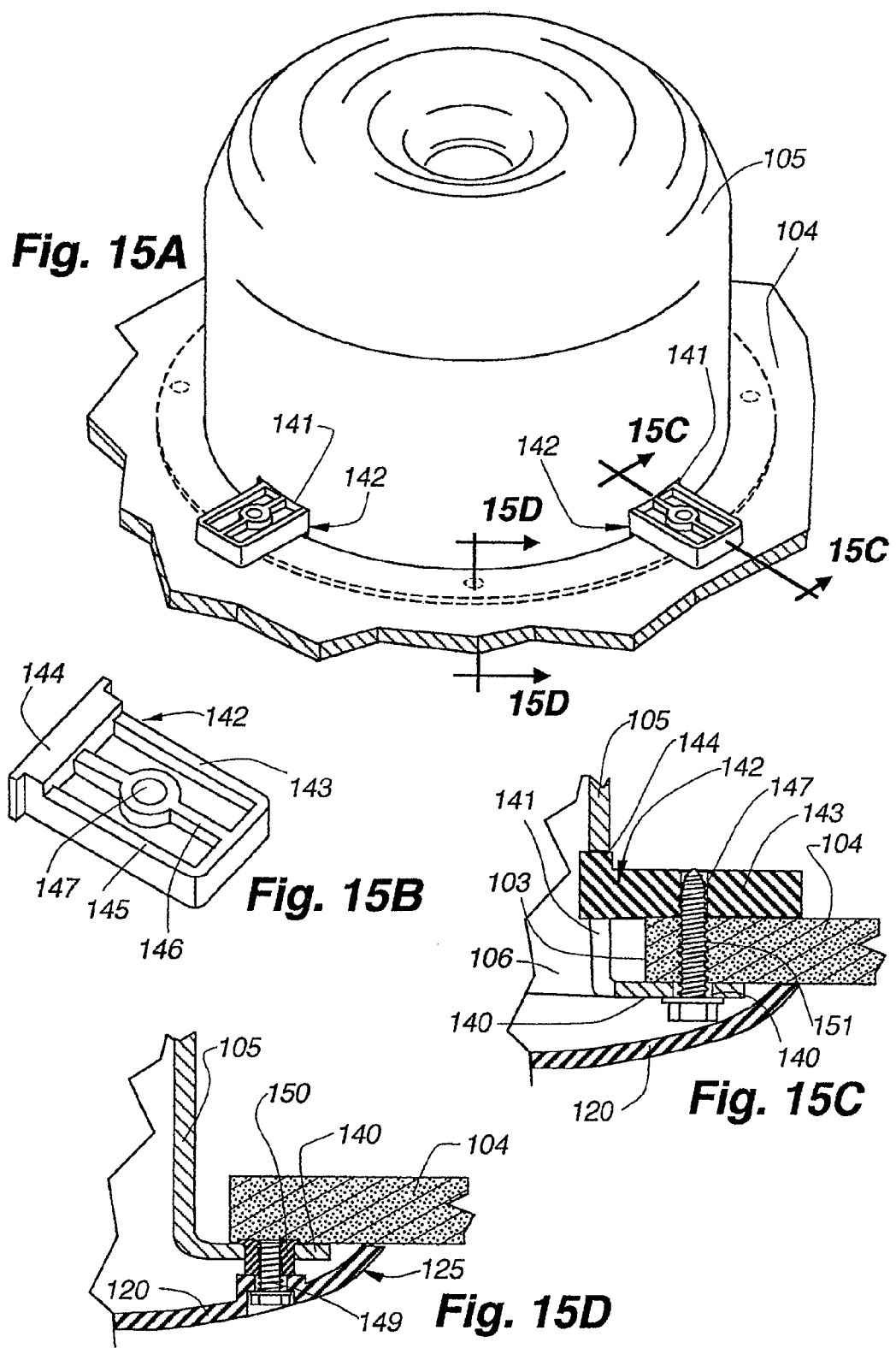

COLUMNAR AIR MOVING DEVICES, SYSTEMS AND METHODS

CROSS-REFERENCE TO RELATED APPLICATIONS

This application is a continuation of U.S. application Ser. No. 13/365,223, filed Feb. 2, 2012, incorporated in its entirety by reference herein, which is a continuation-in-part of U.S. application Ser. No. 12/130,909, filed May 30, 2008, incorporated in its entirety by reference herein, which is a continuation of U.S. application Ser. No. 11/027,039, filed Dec. 30, 2004 now U.S. Pat. No. 7,381,129, issued Jun. 3, 2008, incorporated in its entirety by reference herein, which claims the benefit under 35 U.S.C. §119(e) to U.S. Provisional Patent Application No. 60/553,720 filed Mar. 15, 2004, which is incorporated in its entirety by reference herein. U.S. application Ser. No. 13/365,223 also claims the benefit under 35 U.S.C. §119(e) to U.S. Provisional Patent Application No. 61/521,270 filed Aug. 8, 2011, which is incorporated in its entirety by reference herein.

BACKGROUND OF THE INVENTION

Field of the Invention

The present invention relates to heating, ventilating and air conditioning air spaces, and more particularly to systems, devices and methods for moving air in a columnar pattern with minimal lateral dispersion that are particularly suitable for penetrating air spaces and air temperature de-stratification.

Description of the Related Art

The rise of warmer air and the sinking of colder air creates significant variation in air temperatures between the ceiling and floor of buildings with conventional heating, ventilation and air conditioning systems. Such air temperature stratification is particularly problematic in large spaces with high ceilings such as warehouses, gymnasiums, offices, auditoriums, hangers, commercial buildings, and even residences with cathedral ceilings, and can significantly decrease heating and air conditioning costs. Further, both low and high ceiling rooms can have stagnant or dead air. For standard ceiling heights with duct outlets in the ceiling there is a sharp rise in ceiling temperatures when the heat comes on.

One proposed solution to air temperature stratification is a ceiling fan. Ceiling fans are relatively large rotary fans, with a plurality of blades, mounted near the ceiling. The blades of a ceiling fan have a flat or airfoil shape. The blades have a lift component that pushes air upwards or downwards, depending on the direction of rotation, and a drag component that pushes the air tangentially. The drag component causes tangential or centrifugal flow so that the air being pushed diverges or spreads out. Conventional ceiling fans are generally ineffective as an air de-stratification device in relatively high ceiling rooms because the air pushed by conventional ceiling fans is not maintained in a columnar pattern from the ceiling to the floor, and often disperses or diffuses well above the floor.

Another proposed solution to air temperature stratification is a fan connected to a vertical tube that extends substantially from the ceiling to the floor. The fan may be mounted near the ceiling, near the floor or in between. This type of device may push cooler air up from the floor to the ceiling or warmer air down from the ceiling to the floor. Such devices, when located away from the walls in an open space in a building, interfere with floorspace use and are not aesthetically pleasing. When confined to locations only along the walls of an open space, such devices may not effectively circulate air near the center of the open space. Examples of fans connected to vertical tubes are disclosed in U.S. Pat. No. 3,827,342 to Hughes, and U.S. Pat. No. 3,973,479 to Whiteley.

A device that provides a column of air that has little or no diffusion from the ceiling the floor, without a vertical tube, can effectively provide air de-stratification. U.S. Pat. Nos. 4,473,000 and 4,662,912 to Perkins disclose a device having a housing, with a rotating impeller having blades in the top of the housing and a plurality of interspersed small and large, vertically extending, radial stationary vanes spaced below the impeller in the housing. The device disclosed by Perkins is intended to direct the air in a more clearly defined pattern and reduce dispersion. Perkins, however, does not disclose the importance of a specific, relatively small gap between the impeller blades and the stationary vanes, and the device illustrated creates a vortex and turbulence due to a large gap and centrifugal air flow bouncing off the inner walls of the housing between the blades and vanes. Perkins also discloses a tapering vane section. The tapering vane section increases velocity of the exiting air stream.

A device with a rotary fan that minimizes the rotary component of the air flow while maximizing the axial air flow quantity and velocity can provide a column of air that flows from a high ceiling to a floor in a columnar pattern with minimal lateral dispersion that does not require a physical transporting tube. Such a device should reduce the energy loss by minimizing the rotary component of the air flow, and therefore minimizes turbulence. Such a device should minimize back pressure, since a pressure drop at the outlet of the device will cause expansion, velocity loss and lateral dispersion. The device should have minimum noise and low electric power requirements.

SUMMARY OF THE INVENTION

An air moving device which has a housing with an air inlet and an air outlet spaced from the inlet. A rotary impeller with a plurality of blades is mounted in the housing at the air inlet end and produces air flow with an axial component and a rotary component. A plurality of spaced, longitudinally extending, radial air guide vanes in the housing downstream of the impeller are in close proximity to the impeller blades to minimize the rotary component and change the air flow to a laminar and axial flow in the housing that exits the outlet end in a columnar pattern with minimal lateral dispersion. A method of moving air includes producing an air flow through a housing, and directing the air flow through the housing in a laminar and axial flow and exits an outlet so as to produce a columnar pattern with minimal lateral dispersion. The method also includes directing warm air from near the ceiling toward the floor, allowing the heat from the warm air to be stored in the floor, articles on the floor and the earth under the floor. The method includes directing air in a generally horizontal direction to allow penetration of an air space in a container, trailer truck or a room to promote flushing of that air space and circulation thereof. The device and method are particularly suitable for high efficiency, low power usage, air temperature de-stratification, and to improve air quality and circulation.

BRIEF DESCRIPTION OF THE DRAWINGS

Details of this invention are described in connection with the accompanying drawings that bear similar reference numerals in which:

FIG. 5 is a sectional view taken along line 5-5 of FIG. 2.

FIG. 6 is a sectional view taken along line 6-6 of FIG. 2.

FIG. 7 is a sectional view taken along line 5-5 of FIG. 2, with straight upstream portions of the vanes.

FIG. 11 is a side elevation view, partially cut away, showing the device of FIG. 1 modified for attachment to a light can.

FIG. 11A is a sectional view taken along line 11A-11A of FIG. 11.

FIG. 12 is a side elevation view of the device of FIG. 1 with an intake grill.

FIG. 15A is a top perspective view of FIG. 15.

FIG. 15B is a top perspective view of the fastening member shown in FIG. 15A

FIG. 15C is a sectional view taken along FIG. 15C-15C of FIG. 15A.

FIG. 15D is a sectional view along line 15D-15D of FIG. 15A.

DETAILED DESCRIPTION OF THE PREFERRED EMBODIMENT

Figure 1:
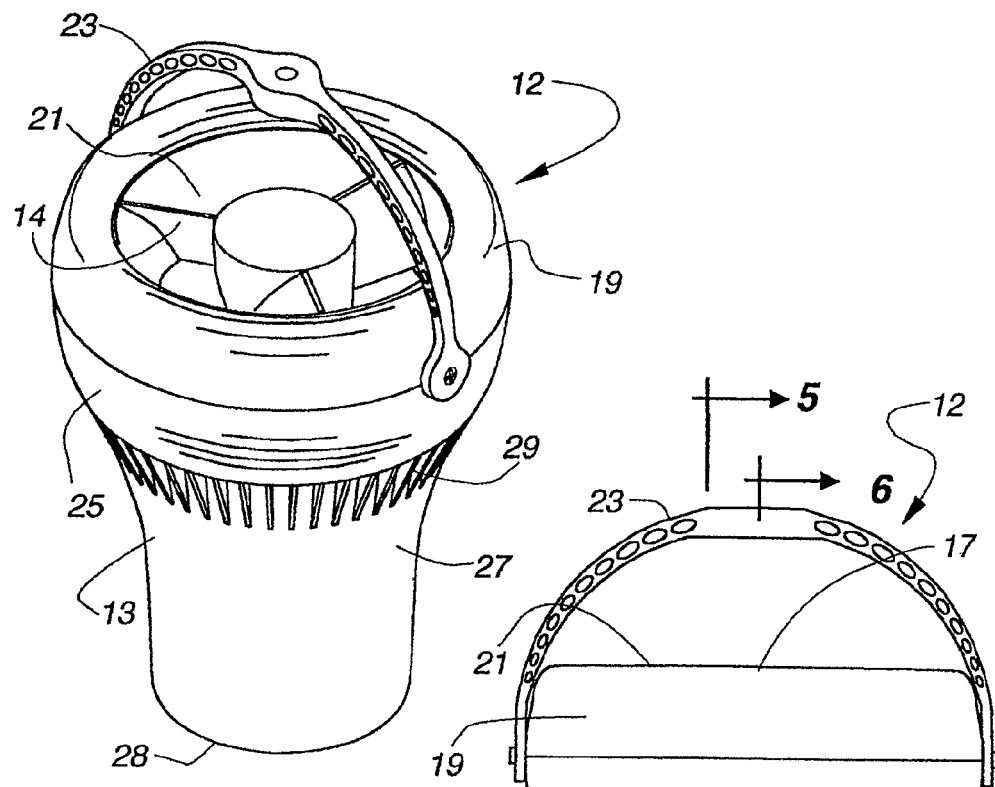
FIG. 1 is a top perspective view of an air moving device embodying features of the present invention.
Figure 2:
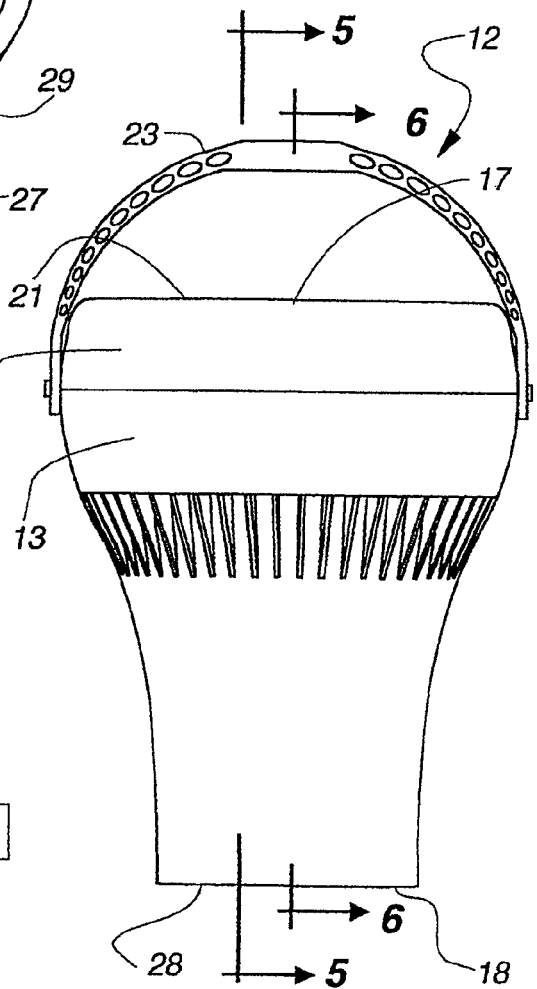
FIG. 2 is a side elevation view of the device of FIG. 1.
Figure 3:
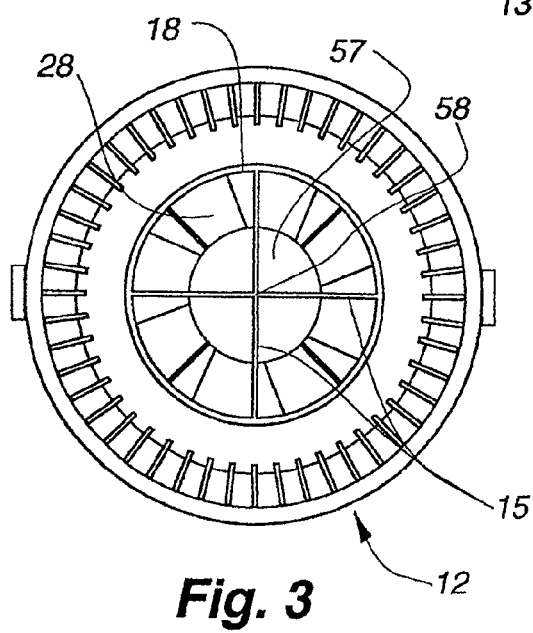
FIG. 3 is a bottom view of the device of FIG. 1.
Figure 4:
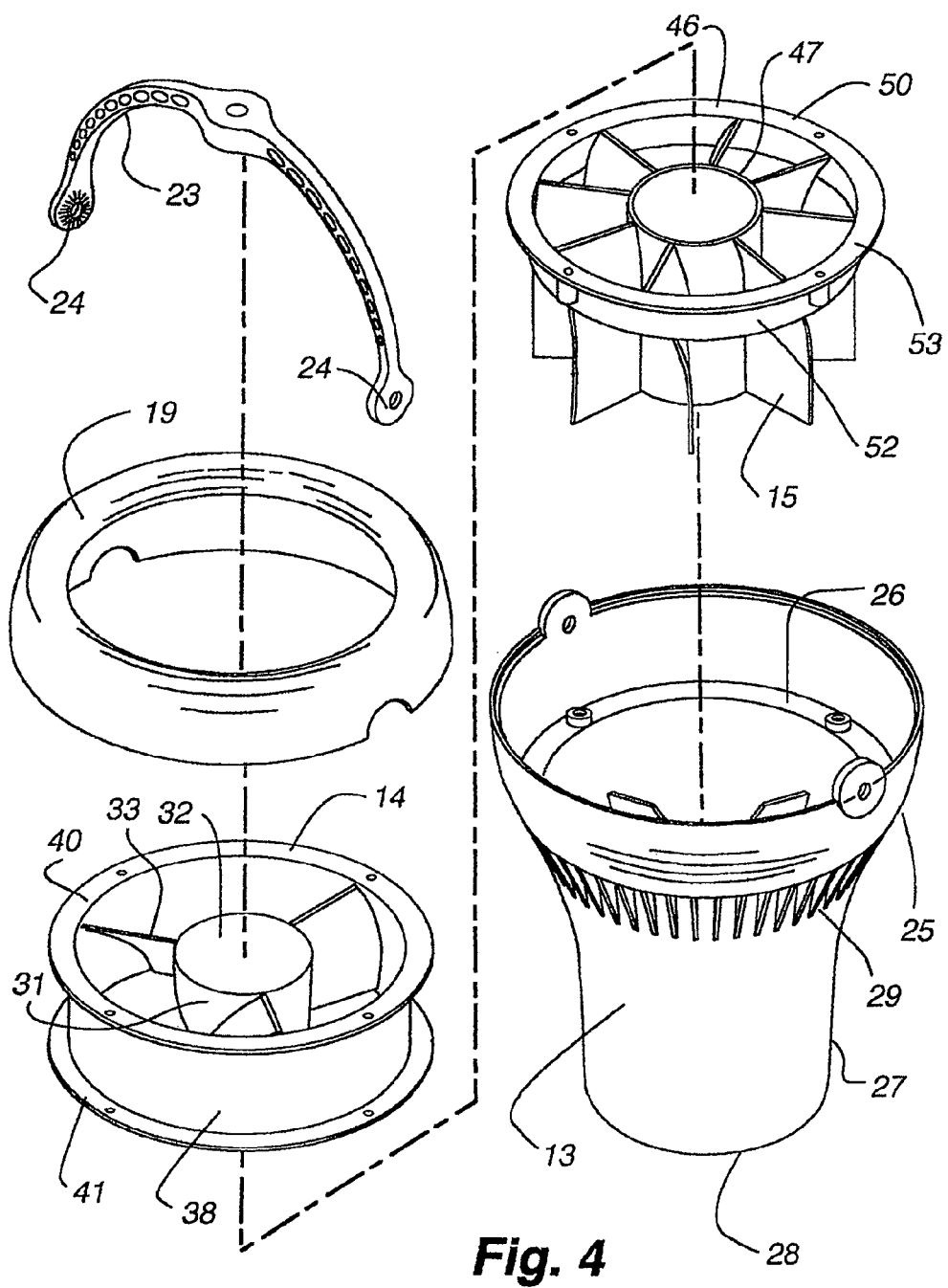
FIG. 4 is an exploded perspective view of the device 5 of FIG. 1.

Referring now to FIGS. 1 to 9, there is shown an air moving device 12 having an elongated outer housing 13, an electric rotary fan 14 in the housing for producing air flow in the housing and a plurality of longitudinally extending, outer radial vanes 15 and an inner housing hub 16 opposite the vanes in the housing downstream of the fan for directing air flow in the housing.

The housing 13 has a circular cross section, and an open first end 17 and an open second end 18 spaced from the first end 17. In the illustrated embodiment, a detachable, axially outwardly convex cowling 19 forms the first end 17 and provides an air inlet 21 with a diameter slightly smaller than the outer diameter of the cowling 19.

The housing 13 has a first section 25 extending from the cowling 19 to an interior shelf 26. A generally C shaped hanger 23 mounts at opposite ends 24 to opposite sides of the housing 13 at the upper end of the first section 25, for mounting the air moving device 12 to a support. The first section 25, when viewed from the side, has a curved, slightly radially outwardly convex shape that conforms to the curvature of the cowling 19. The shelf 26 extends radially inwardly to join with the upstream end of a second section 27. The second section 27 tapers inwardly and extends axially from the shelf 26 to the second end 18 along a smooth curve that goes from radially outwardly convex near the shelf 26 to radially outwardly concave near the second end 18. The second end 18 forms an air outlet 28 that has a smaller diameter than the air inlet 21. A plurality of circumferentially spaced external fins 29 extend from the shelf 26 to the second section 27 to provide the appearance of a smooth curve from the air inlet 21 to the air outlet 28 when the housing 13 is viewed from the side.

The fan 14 includes an impeller 31 having a cylindrical, inner impeller hub 32, with an electric motor 34 therein, and a plurality of rigidly mounted, circumferentially spaced blades 33 extending radially from the impeller hub 32. In the illustrated embodiment the impeller 31 has three equally spaced blades 33 and rotates about an axis in a counter-clockwise direction when viewed from above. Each blade 33, in side view, extends from an upstream edge 35, downwardly and leftwardly to a downstream edge 36 with each blade 33 being slightly concave, in an airfoil or wing shape, downwardly to propel air rightwardly as shown by the arrow. Each blade 33 then inclines at a selected angle to the axis of rotation of the impeller. Each blade 33 shown extends axially and radially toward the outlet or second end 18 to direct air axially with a rotary component. If the motor 34 runs in the opposite direction, the incline of the blades 33 would be reversed. The fan 14 includes a stationary cylindrical mounting ring 38 that extends around the blades 33, with the impeller hub 32 being rotably mounted relative to the mounting ring 38. The mounting ring 38 has spaced, protruding upstream and downstream rims 40 and 41. The fan 14 mounts in the housing 13 between the cowling 19 and the shelf 26.

Each of the vanes 15 is identical and includes upstream portion 43 and a downstream portion 44. The upstream portion 43 is carried in a stator 46. The stator 46 has a cylindrical stator hub 47 with a diameter substantially equal to the diameter of the impeller hub 32.

The upstream portions 43 of the vanes 15 are mounted in a circumferentially spaced arrangement around the stator hub 47, and extend longitudinally along and radially from the stator hub 47. Each upstream portion 43 has an upstream end 48 and a downstream end 49. A support body 50 includes a cylindrical stator ring 52 that extends around the upstream portions 43 and connects to the outer ends of the upstream portions 43 of the vanes 15 near the upstream ends 48. The support body 50 also includes a protruding stator rim 53 that is substantially planar with the upstream ends 48 of the upstream portions 43 of the vanes 15, and that connects to the stator ring 52 and extends radially outwardly therefrom.

The housing 13 has, an inner surface and the inner housing hub 16 has an outer surface concentric with a spaced from the housing inner surface to define an air flow passage through the housing. The inner housing hub 16 includes the fan hub 32, stator hub portion 47 and downstream hub portion 57, each having an outer surface and arranged end to end along the center of the housing and opposite and spaced from the housing inner surface to define the air flow passage. In particular, these outer surfaces shown are cylindrical and substantially the same diameter for a substantial portion of the passage and as the housing 13 converges the downstream hub portion 57 converges to generally follow the curvature of the inside surface of the housing.

The stator 46 nests in and is separable from the housing 13 with the stator rim 53 between the shelf 26 of the housing 13 and the downstream rim 41 of the mounting ring 38 of the fan 14, and with a gap 55 having a selected size between the downstream edge 36 of the blades 33 of the impeller 31 and the upstream ends 49 of the upstream portions 43 of the vanes 15. If the gap 55 is too large, turbulence will be generated in the air flow between the impeller 31 and the vanes 15, reducing the velocity of the air flow. If the gap 55 is too small, fluid shear stress will generate noise. The size of the gap 55 is generally selected as no greater than a maximum selected dimension to avoid turbulence and no less than a selected minimum dimension to avoid noise, and more particularly selected as small as possible without generating noise.

The selected size of the gap 55 is generally proportional to the diameter of the impeller 31 and may further be affected by the speed of the impeller 31. The following are examples: For an impeller 31 with a diameter of 6.00", at 1800 rpm, the maximum size of the gap 55 should be 1.25" and the minimum gap should be 0.2". For an impeller 31 with a diameter of 8.5", at 1400 rpm, the maximum size of the gap 55 should be 1.25", and the minimum gap should be 0.2" but could be 0.020 for lower rpm's as the size of the gap is rpm dependent. Generally, the maximum size of the gap 55 should be less than one half the diameter of the impeller 31.

In the illustrated embodiment, eight equally spaced upstream portions 43 of the vanes 15 are provided, and when viewed from the side, the upstream portions 43 of the vanes 15 extend straight upwardly from the downstream ends 49 and then curve leftwardly near the upstream ends 48. The upstream portion 43 of each curved vane portion is inclined at an angle opposite the incline of the blade 33 that extends axially and radially inward toward the outlet or second end 28 to assist in converting the rotary component of the air flow into laminar and axial flow in the housing.

Straight upstream portions 43A of the vanes 15 may also be used, as shown in FIG. 7, and other numbers of vanes 15 may be used. Further, if the motor 34 runs in the opposite direction, the incline of the curvature near the upstream ends 48 would be reversed.

The downstream portions 44 of the vanes 15 attach at an inner end to a downstream inner housing hub portion 57, are circumferentially spaced and extend radially outwardly from the housing hub portion 57 to the housing 13. The housing hub portion 57 and the downstream portions 44 of the vanes 15 extend axially from the stator 46 to or near the air outlet 28. The housing hub portion 57 has a circular cross section, has a diameter substantially equal to the diameter of the stator housing hub portion 47 at the upstream end adjacent to the stator housing hub portion 47, and tapers downstream to a point 58 near the air outlet 28.

This hub portion may be characterized as torpedo shaped. In the illustrated embodiment there are four downstream portions 44 of the vanes 15 circumferentially spaced at 90 degrees, with each downstream portion 44 being aligned with an upstream portion 43 of a vane 15. Other numbers of downstream portions 44 of the vanes 15 can be used.

The number of the blades 33 may be 2, 3, 4, 5, 6, 7 or 8. The number of the vanes 15 may be 2, 3, 4, 5, 6, 7 or 8. The number of vanes 15 should be different from the number of blades 33. If the number of vanes 15 and blades 33 are the same, added noise is generated due to harmonics.

The air moving device 12 discharges air at a high velocity in a generally axial flow having a columnar pattern with minimal lateral dispersion after exiting the air outlet 28. The cowling 19 extends along a curve toward the inside to reduce turbulence and noise for air flow entering the air inlet 21. The impeller hub 32, the stator hub 47 and the housing hub 57 form the inner housing hub 16. The taper of the housing hub 57 generally follows the taper of the housing 13 So that the cross sectional area for air flow decreases about 10% to 35% through the air moving device 12 to avoid back pressure and at the same time increase air flow velocity. In the embodiment shown the air flow decreases about 22%.

The vanes 15 convert the rotary component of the air flow from the impeller 31 into laminar and axial air flow in the housing. The leftward curve of the upstream ends 48 of the upstream portions 43 of the vanes 15, in the illustrated embodiment, reduces the energy loss in the conversion of the rotary component of the air flow from the impeller 31 into laminar and axial air flow in the housing. The small gap 55 between the impeller 31 and vanes 15 prevents the generation of turbulence in the air flow in the gap 55. The taper of the housing 13 in combination with the taper of the housing hub 57 to the point 58 allows the air flow to exit the air outlet 28 in a continuous, uninterrupted columnar pattern with minimal dispersion, with no center hole or gap at a linear speed greater than would be imparted by a fan alone. The inside surface of the housing 13 is a substantially smooth uninterrupted surface to minimize turbulence and energy loss.

Figure 8:
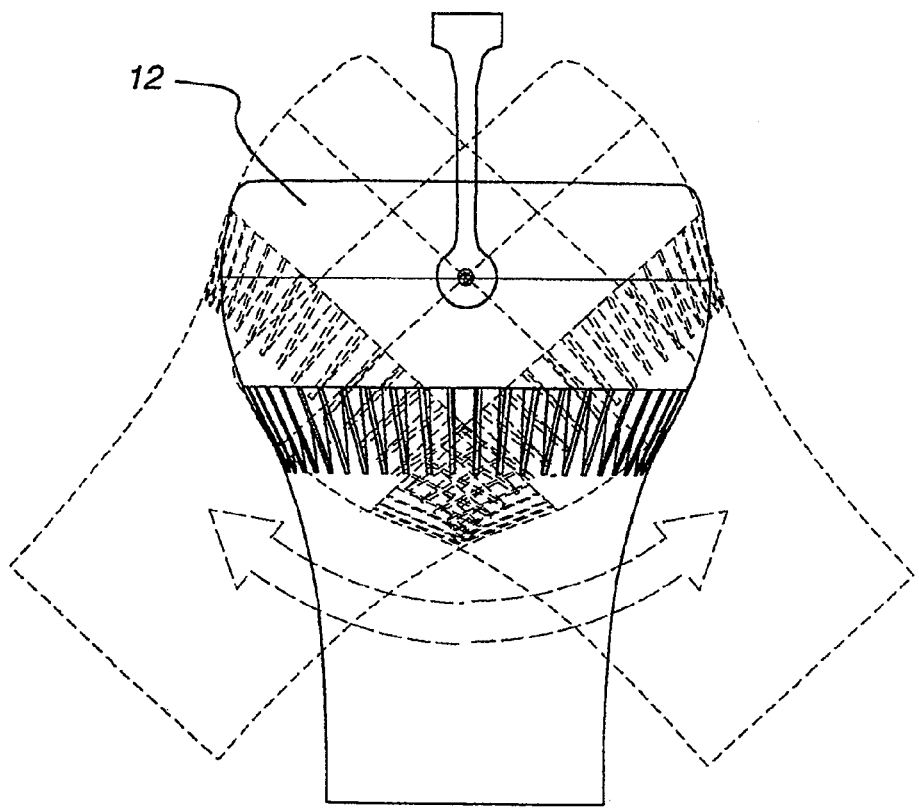
FIG. 8 is a side elevation view of the device of FIG. 1 showing angular direction of the device.
Figure 9:
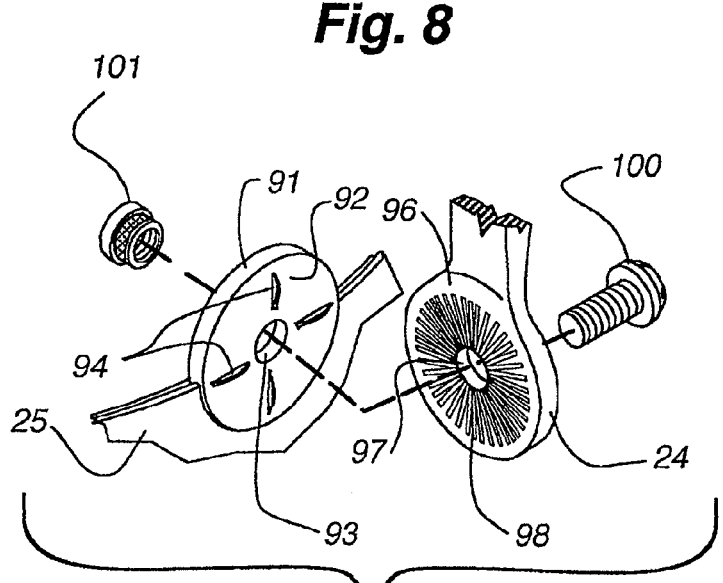
FIG. 9 is an enlarged, partial exploded view of the hangar attachment of the device of FIG. 1.

The hanger 23 is mounted to rotate and lock relative to the housing 13, so that when the hanger 23 is attached to an overhead support such as ceiling, the air flow from the air moving device 12 may be directed vertically or aimed at any selected angle from the vertical as shown in FIG. 8. As shown in FIGS. 1 and 9, the first section 25 of the housing 13 includes mounting tabs 91 on opposite sides on the upper edge of the first section 25. Each mounting tab 91 includes a round, outwardly directed mounting face 92, and a housing aperture 93 that extends inwardly through the center of the mounting tab 91. A pair of outwardly projecting housing ridges 94 extend radially on the mounting face 92 on opposite sides of the housing aperture 93.

Each end 24 of the hanger 23 has a round, inwardly facing hanger end face 96, similar in size to the mounting face 92 on the housing 13. A hanger end aperture 97 extends through the center of the hanger end face 96. A plurality of spaced, radially extending grooves 98, sized to receive the housing ridges 94, are provided on each hanger end face 96. Bolt 100 extends through the hanger end aperture 97 and threads into an internally threaded cylindrical insert 101, rigidly affixed in housing aperture 93. The angle of the housing 13 is chosen by selecting a pair of opposed grooves 97 on each hanger end 24 to receive the housing ridges 94. The pivotal arrangement enables the housing to move to a selected angle and is lockable at the selected angle to direct air flow at the selected angle.

Figure 10:
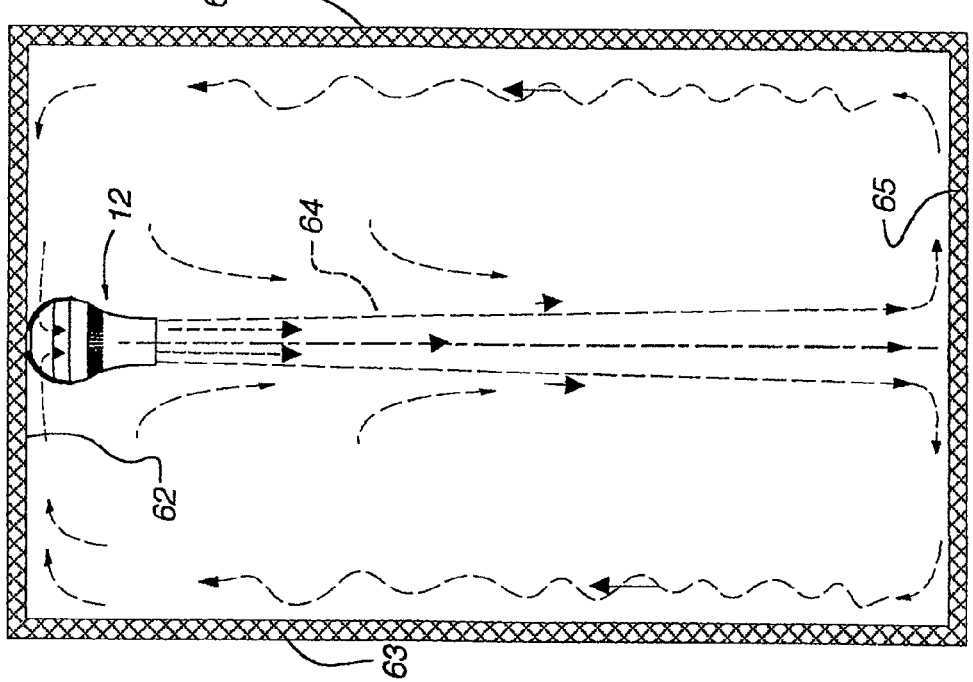
FIG. 10 is a side view of a room with the device of FIG. 1 showing an air flow pattern with dashed lines and arrows.

FIG. 10 shows an air moving device 12 mounted to the 13 ceiling 62 of a room 63 shown as being closed sided with opposed side walls. Warm air near the ceiling 62 is pulled into the air moving device 12. The warm air exits the air moving device 12 in a column 64 that extends to the floor 65. When the column 64 reaches the floor 65, the warm air from the ceiling pushes the colder air at the floor 65 outward towards the opposed side walls 66 and upward towards the ceiling 62. When the column 64 reaches the floor 65, the warm air from the ceiling will also transfer heat into the floor 65, so that heat is stored in the floor 65. The stored heat is released when the ceiling is cooler than the floor. The heat may also be stored in articles on the floor and earth under the floor. The air moving device 12 destratifies the air in a room 63 without requiring the imperforate physical tube of many prior known devices. The air moving device 12 destratifies the air in a room 63 with the warmer air from the ceiling 62 minimally dispersing before reaching the floor 65, unlike many other prior known devices. The air moving device 12 will also remove dead air anywhere in the room. It is understood that the air moving device 12 may also be mounted horizontally in a container, trailer truck or room as is describe hereafter.

Referring to FIG. 11, an air moving device 12 is fitted with an inlet grill 68 and an electric connector 69 for attachment to a light can 70 with a light bulb socket 71 at the upper end. The inlet grill 68 includes a plurality of circumferentially spaced grill fins 72 that attach to the first end 17 of the housing 13. The grill fins 72 are separated by air intake slots 73, and extend axially outwardly from the first end 17 and curve radially inwardly and are integral with a flat circular mounting plate 74 that is substantially parallel with the first end 17. The electrical connector 69 has a tube 76 that is integral at one end with the center of the mounting plate 74 and extends axially therefrom, and a light bulb type, right hand thread externally threaded male end 77 attached to the other end of the shaft 78. Grill 68, plate 74 and tube 76 are shown as made of a one piece construction. Plate 74 has holes that received screws 83 or like fasteners to fasten plate 74 to ceiling 62.

The shaft 78 telescopes in the tube 76. The tube 76 has a pair of opposed keyways 76A that receive keys 78A on the shaft 78 which allow axial sliding movement of the shaft 78 in the tube 76. A compression spring 75 fits in the tube and bears against the bottom of shaft 78 and top of plate 74. Preferably the shaft 78 has a selected length relative to the length of the can 70 such that when the air moving device 12 is mounted in a can 70 in a ceiling 62, the threaded male end 77 engages the socket 71 before the mounting plate 74 contacts the ceiling 62 and when the threaded male end 77 is screwed into the socket 71, the mounting plate 74 bears against the ceiling 62. The spring 75 is compressed between plate 74 and shaft 78. Screws 83 fasten the plate to the ceiling 62. Since the light can 70 may be open to air above the ceiling 62, the mounting plate 74 is preferably sized to cover the open lower end of the can 70, so that only air from below the ceiling 62 is drawn into the air moving device 12. The air moving device 12 fitted with the inlet grill 68 and the electrical connector 69 can also be used with a ceiling light socket.

The air moving device 12 may include an intake grill 79 for preventing objects from entering the impeller 31, as shown in FIG. 12. The intake grill 79 shown has a substantially hemispherical shape, and includes a plurality of circumferentially spaced grill fins 80 separated by intake slots 81. The grill fins 80 extend axially outwardly and curve radially inwardly from the first end 17 of the housing 13 to a central point 82 spaced from the first end 17. Other shapes of intake grills are suitable for the present invention.

Figure 13:
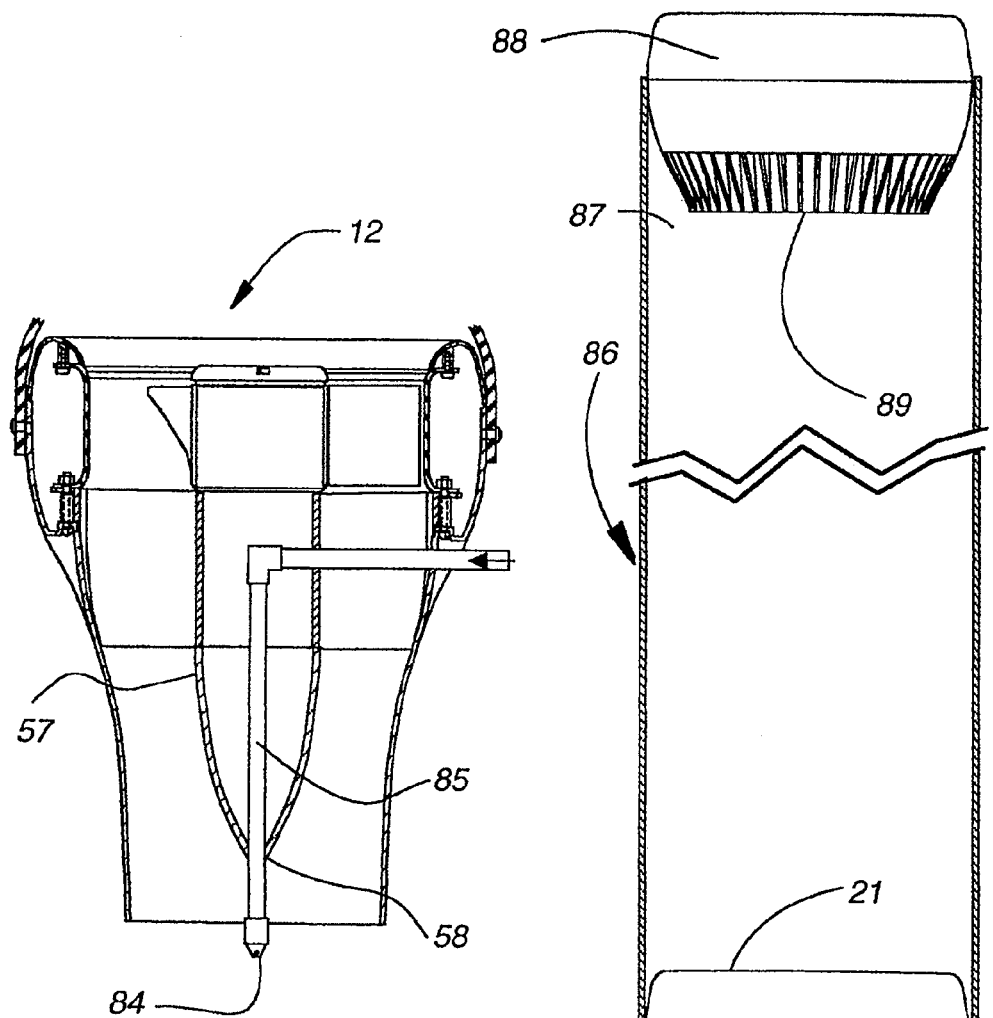
FIG. 13 is a sectional view taken along line 6-6 of FIG. 2 of the device of FIG. 1 with a misting nozzle.

FIG. 13 shows an air moving device 12 with a misting nozzle 84. The nozzle 84 extends through the point 58 of the housing hub 57 to spray water into the column of air exiting the air outlet 28 to cool the air through evaporation. The media exiting the nozzle 84 and being supplied through tube 85 can have other purposes such as a disinfectant or a fragrance or a blocking agent for distinctive needs. The nozzle 84 connects to a water line 85, in the housing hub 59 that connects to a water source (not shown).

Figure 14:
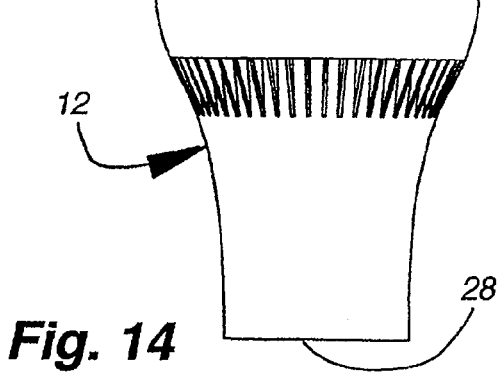
FIG. 14 is a side elevation view of the device of FIG. 1 in combination with a tube and second air moving device.

FIG. 14 shows an air moving system 86 for use in buildings with very high ceilings, including an air moving device 12, an upwardly extending, tube 87 (shown cut away) connected at a lower end to the air inlet 21 of the air moving device 12, and a truncated upper air moving device 88 having an air outlet 89 connected to the upper end of the tube 87. The housing of device 88 is called truncated because it may be shortened or cut off below the fins 29. A conventional air moving device 12 may be used for device 88. The tube 87 may be flexible and is preferably fire resistant. The air moving system 86 is mounted to a ceiling or like support with the air outlet 28 of the air moving device 12 spaced above the floor, preferably about 10 to 50 feet. The tube may be for example from 30 to 100 feet long.

The upper air moving device 88 at the top of the system 86 has a higher air moving flow capacity than the air moving device 12 at the bottom of the cascading system 86. By way of example, and not as a limitation, the upper air moving device 88 may have a capacity of 800 cfm and the air moving device 12 may have a capacity of 550 cfm.

FIGS. 15, 15A, 15B, 15C, 15D and 16 show the air moving device 12 mounted in an opening 103 in a ceiling 104. A generally cylindrical can 105 mounts on and extends above the ceiling 104, and has an open can bottom 106, and a closed can top 107. The can top 107 includes a semi-circular, downward opening, circumferentially extending channel 108. A semi-circular fin 111 extends radially across the channel 108 to prevent swirling of the air before entering the air inlet 21. Additional fins may be used. A grill and support assembly 125 mounts to the ceiling and extends and connects to the exterior of the housing of device 12. A grill including spaced openings 110 between fins 109 to allow air to flow up from the room along the housing and past the cowling 19 into the inlet 21. The grill and support assembly 125 includes an outer ring 120 fastened to the underside of the ceiling including the convexly curved grill fins 109 with air openings 110 between connected outer ring 120 and an inner ring 121. Ring 121 has a spherical concave inner bearing surface 122.

A ring 123 has a spherical convexly curved exterior bearing surface 124 is mounted on and affixed to the housing with bearing surfaces 122 and 124 mating in a frictional fit to support the housing to be at a vertical position or tilted at an angle to the vertical axis and be held by friction at the vertical axis or a selected angle relative to the vertical axis to direct air flow as required.

The can 105 has an outwardly extending bottom flange 140 that fits against the underside of the ceiling 104. The can 105 preferably has four circumferentially spaced bottom openings 141 at 90 degree intervals that are rectangular in shape and extend up the can wall a short distance from the bottom flange 140. A clamping member 142 preferably made as a molded plastic body has a main body portion 143 above the ceiling 104 outside the can wall and an end flange portion 144 that fits inside the can opening 142. The main body portion 143 has a U-shaped outer wall portion 145 and an inner hub portion 146 having an aperture 147. The clamping member 142 inserts into the opening 141 via the open end of the can. A bolt fastener 151 extends through a hole in the flange, through a hole in the ceiling and threads into the aperture 147 in the main body portion to clamp the can 105 to the ceiling 104.

Figure 15:
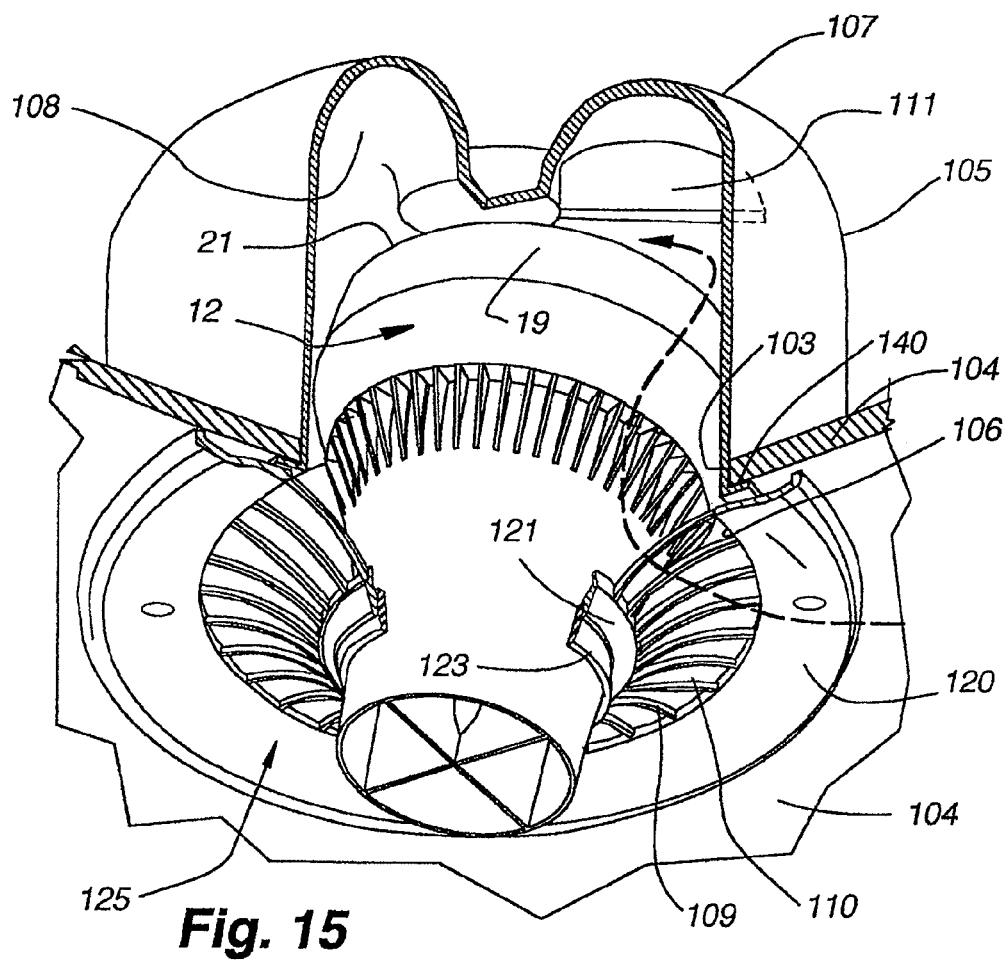
FIG. 15 is a bottom perspective view, partially cut away, showing the device of FIG. 1 mounted in a drop ceiling.
Figure 16:
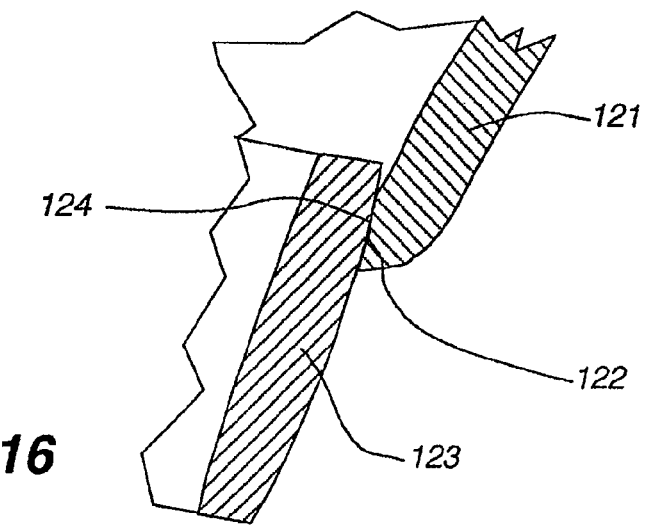
FIG. 16 is an enlarged view of a portion of FIG. 15.

As shown in FIG. 15D the grill and support assembly 125 is mounted to the ceiling 104 and can 105 by a bolt fastener 149 extending through an aperture in ring 120, through the ceiling 104 and into a nut 150 in flange 140 in the can. Preferably there are four bolt fasteners 149 at 90 degree intervals midway between fasteners 151 above described. The ceiling 104 typically would be a plasterboard ceiling in which a suitable hole is cut. A variation of FIG. 15 would be to extend or form the peripheral of outer ring 120 into a flat panel having a dimension of 2 ft. by 2 ft. that would fit in and be held by a grid that holds a conventional ceiling panel.

Figure 17:
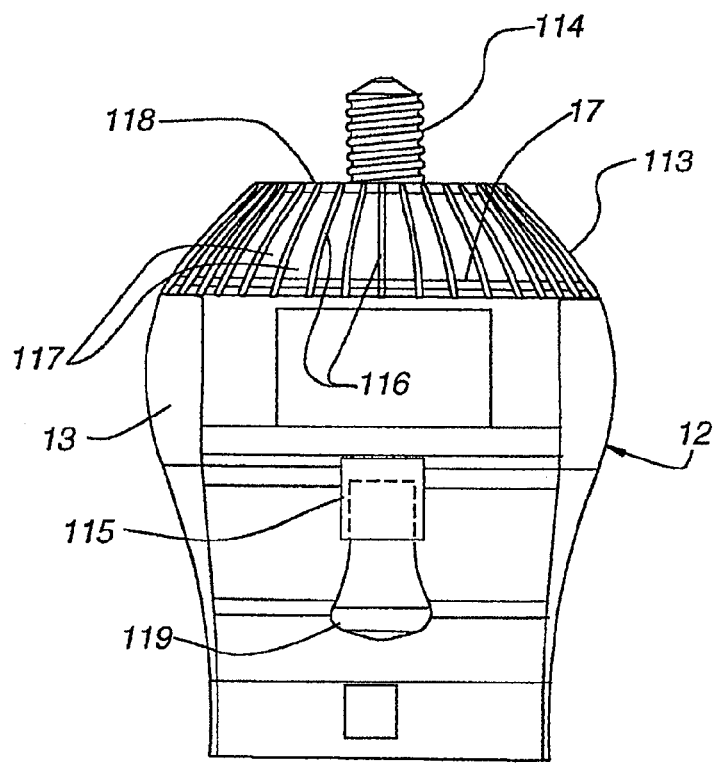
FIG. 17 is a side elevation view, partially cut away, showing the device of FIG. 1 modified for attachment to a light socket and having a light bulb at the lower end.

Referring to FIG. 17, an air moving device is fitted with an inlet grill 113, a light bulb style threaded male end 114 for threading into a light bulb socket, and a light bulb socket 115. The inlet grill 113 includes a plurality of circumferentially spaced grill fins 116 that attach to the first end of the housing 13. The grill fins 116 are separated by air intake slots 117, and extend axially outwardly from the first end 17 and curve radially inwardly to a flat circular mounting plate 118 that is substantially parallel with and spaced axially from the first end 17. Threaded male end 114 is mounted on and extends upwardly from the mounting plate 118. The socket 115 is mounted inside the housing 13 in a downwardly opening fashion so that light from a bulb 119 threaded into the socket 115 is directed downwards.

Figure 18:
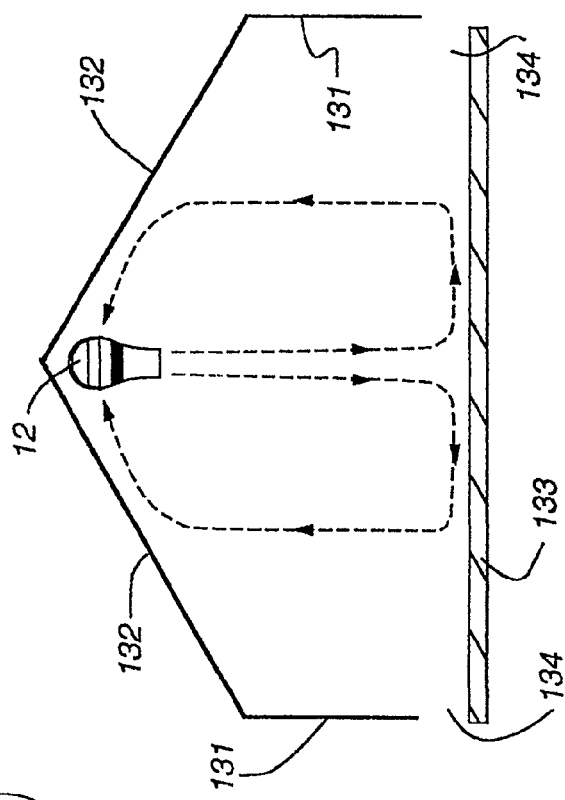
FIG. 18 is a schematic view of an open sided tent with an air moving device in the top.

Referring now to FIG. 18, there is shown a tent having an inclined top 132 extending down from an apex and connected at the lower end to a vertical side wall 131 and terminating above a floor 133 to provide a side opening 134 so that the tent is an open sided room. The air moving device 12 is mounted below the top apex and directs the air in the room downwardly in a columnar pattern to the floor and along the floor and then back with some air passing in and out the side openings 134 along the floor 133. For wide tents, the air will pass up before it reaches the side walls.

The air moving device and system herein described has relatively low electrical power requirement. A typical fan motor is 35 watts at 1600 rpm for an impeller of 8.5" that will effectively move the air from the ceiling to the floor in a room having a ceiling height of 30 ft. Another example is 75 watts with an impeller diameter 8.5" at 2300 rpm in a room having a ceiling height of 70 ft.

Figure 19:
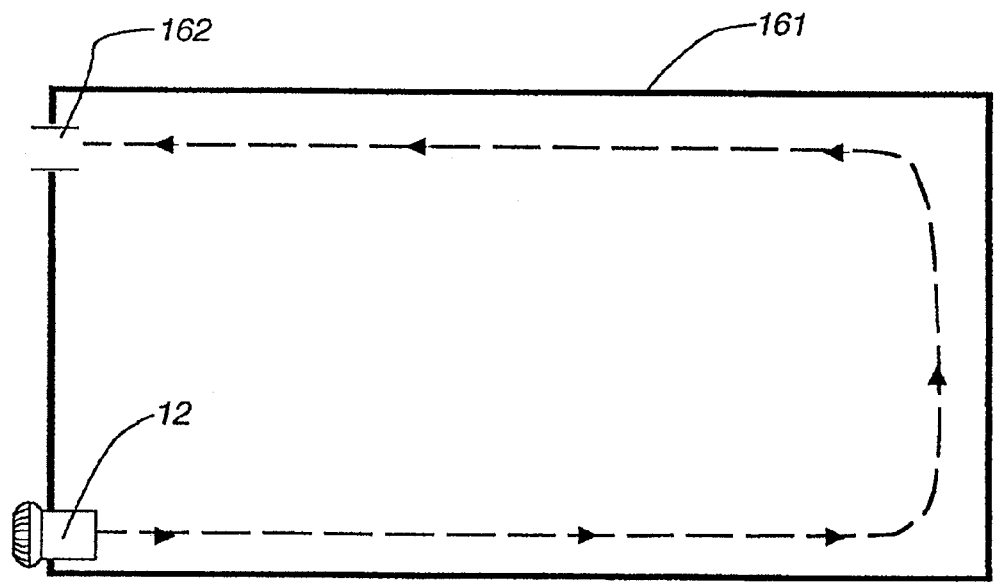
FIG. 19 is a schematic view of a shipping container with an air moving device at one lower end.
Figure 20:
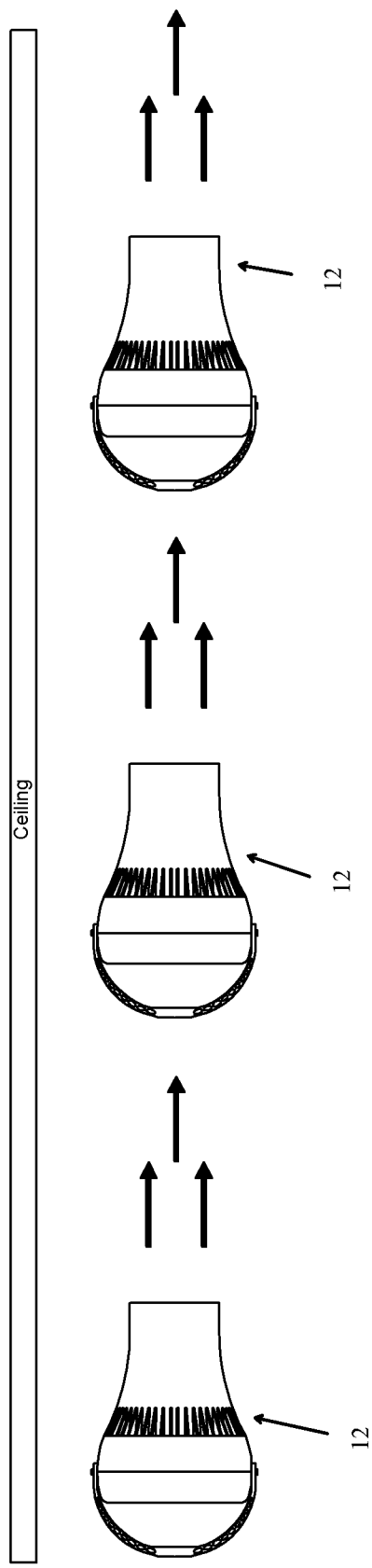
FIGS. 20-24 are schematic representations of a plurality of air moving devices used to create a cascading airflow.

Referring now to FIG. 19, there is shown a shipping container 161 having an air moving device 12 disposed horizontally in the lower left end. The device 12 directs the air horizontally along the bottom wall or floor, up the opposite side wall and across the top wall to exit an outlet duct 162 above and spaced from the device 12 of the air moving device. The device 12 will penetrate the air and promote flushing and circulation of the air space. The device 12 may be mounted to direct the air generally horizontally or up or down at an angle to the true horizontal. This arrangement may be provided in other air spaces such as a trailer truck, room or the like.

It is understood that the stator 46 and housing 13 could be made as a single unit. It is also understood that the housing 13 may be made in two sections as for example a tubular section of a selected length may be added to the end of a truncated devices as shown in FIG. 14.

Further to the discussion above, and referring to FIGS. 20-25, in some embodiments a plurality of the air moving devices 12 described above can be used to create a cascading flow of air from one location to a second location. For example, with reference to FIG. 20, in some embodiments a plurality of air moving devices 12 can be positioned at or near the ceiling of a room or roof of a building. Alternatively or in addition, the air moving devices can be positioned within 4 feet of the floor, within 8 feet of a floor, within 12 feet of a floor or greater than 12 feet from the floor. The air moving devices 12 can be distanced apart from one another. The distances between the air moving devices 12 can vary. In some embodiments the distances can be equal between each air moving device 12. In some embodiments the distance between a first and second air moving device 12 can be different than the distance between the second and a third air moving device 12. In some embodiments the distance between two air moving devices 12 can be approximately 5 feet, 10 feet, 15 feet, 20 feet, 25 feet, 30 feet, 35 feet, or any other desired distance.

The air moving devices 12 can be angled and/or positioned such that the air flow exiting a first air moving device 12 is directed generally towards a second air moving device 12 and/or the air flow exiting the second air moving device 12. In some embodiments the air flow exiting the first air moving device 12 and the air flow exiting the second air moving device 12 are directed generally in the same direction, such that when the air flow exiting the first air moving device 12 reaches the air flow exiting the second air moving device 12, the two air flows generally merge together.

Often times the air flow exiting an air moving device 12 will have a higher velocity nearest the air moving device 12 from which it left, as compared with the velocity of the air flow as it moves farther away from the air moving device 12. The farther away the air flow is from the air moving device 12, the more the air flow will slow down. Thus, with reference to FIG. 20, the air moving devices 12 can be arranged such that as the air flow of a first air moving device 12 is at least 80% of its initial velocity, at least 60% of its initial velocity, at least 40% of its initial velocity, at least 20% of its initial velocity, or at least 10% of its initial velocity before the airflow of the first air moving device 12 encounters and/or is accelerated into the higher velocity air flow created by a second air moving device 12. Desirably, the second air moving device accelerates the air to at least 120%, at least 140%, 160%, 200%, 300%, 400%, 500% of the velocity of the air flow when the air flow from the first air moving device encounters and/or is accelerated into the higher velocity air flow created by a second air moving device 12. In this manner, the second air moving device 12 acts to cascade the air from the first air moving device 12, and to continue to push it along with the air flow from the second air moving device 12. In some embodiments, at least a portion of the air flow from the first air moving device 12 also enters the second air moving device 12, and is directed back out the second air moving device 12 at a higher velocity. Thus, both the second air moving device 12, as well as its exiting air flow, can be used to propel the air flow from the first air moving device 12. With a plurality of air moving devices 12 working in concert, a cascading effect can be achieved, in which the air moving devices 12 work together to move air. This cascading effect can advantageously be used to create a continuous movement of air throughout long stretches of space. This continuous movement of air can help to ventilate, clean, cool, and/or prevent stale air pockets from building up over time.

While the air moving devices 12 can be used within buildings, they can also be used outdoors. For example, people are often required to stand in long lines at amusement parks or other locations. The long lines can extend partially within a building, and/or outside a building. Heat can build up over time, making people uncomfortable as they wait, as can pockets of stale air. Thus, a plurality of air moving devices 12 can be arranged and/or mounted outdoors as well, to help cool and/or remove pockets of stale air.

Figure 21:
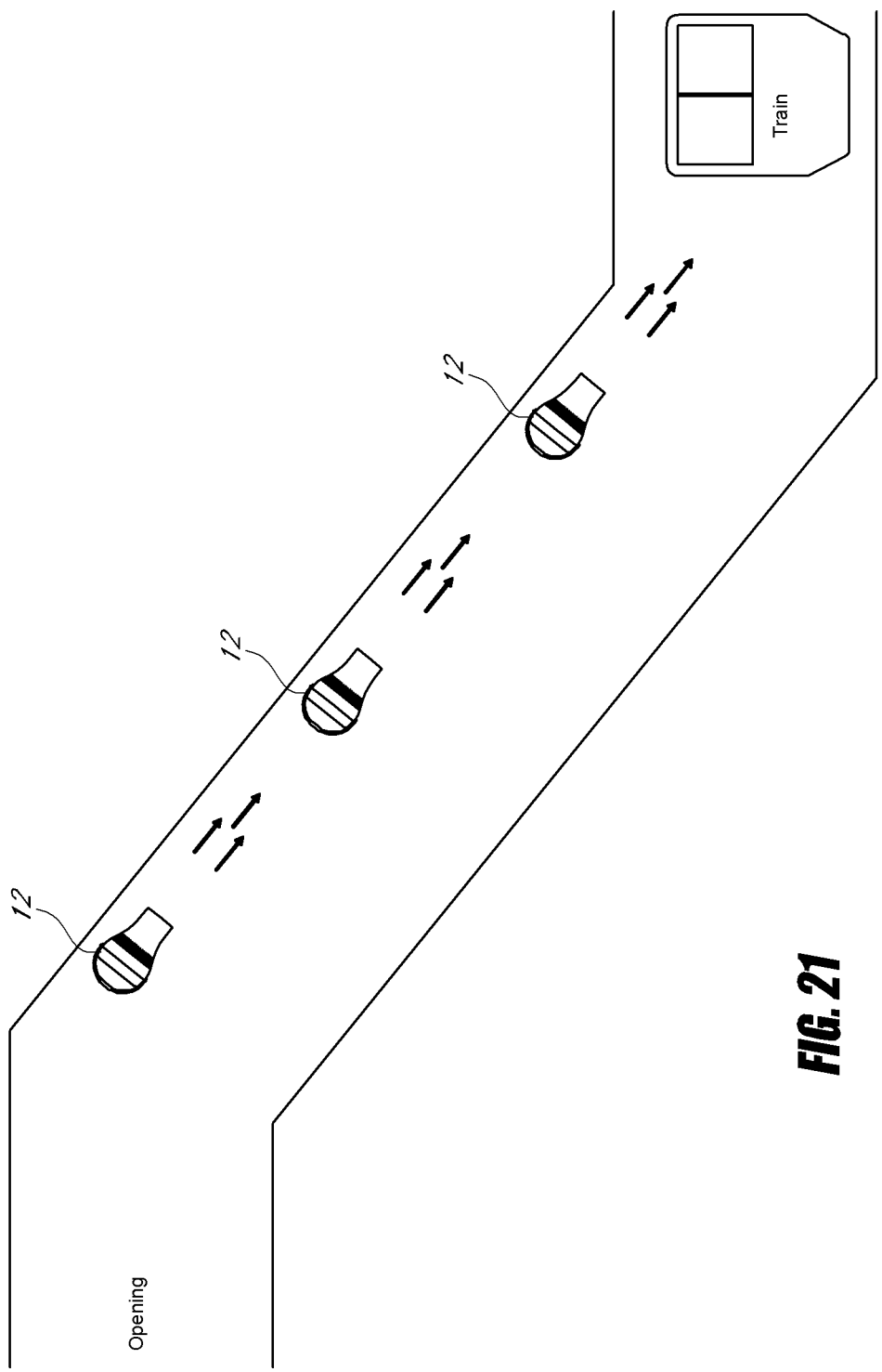
Figure 22:
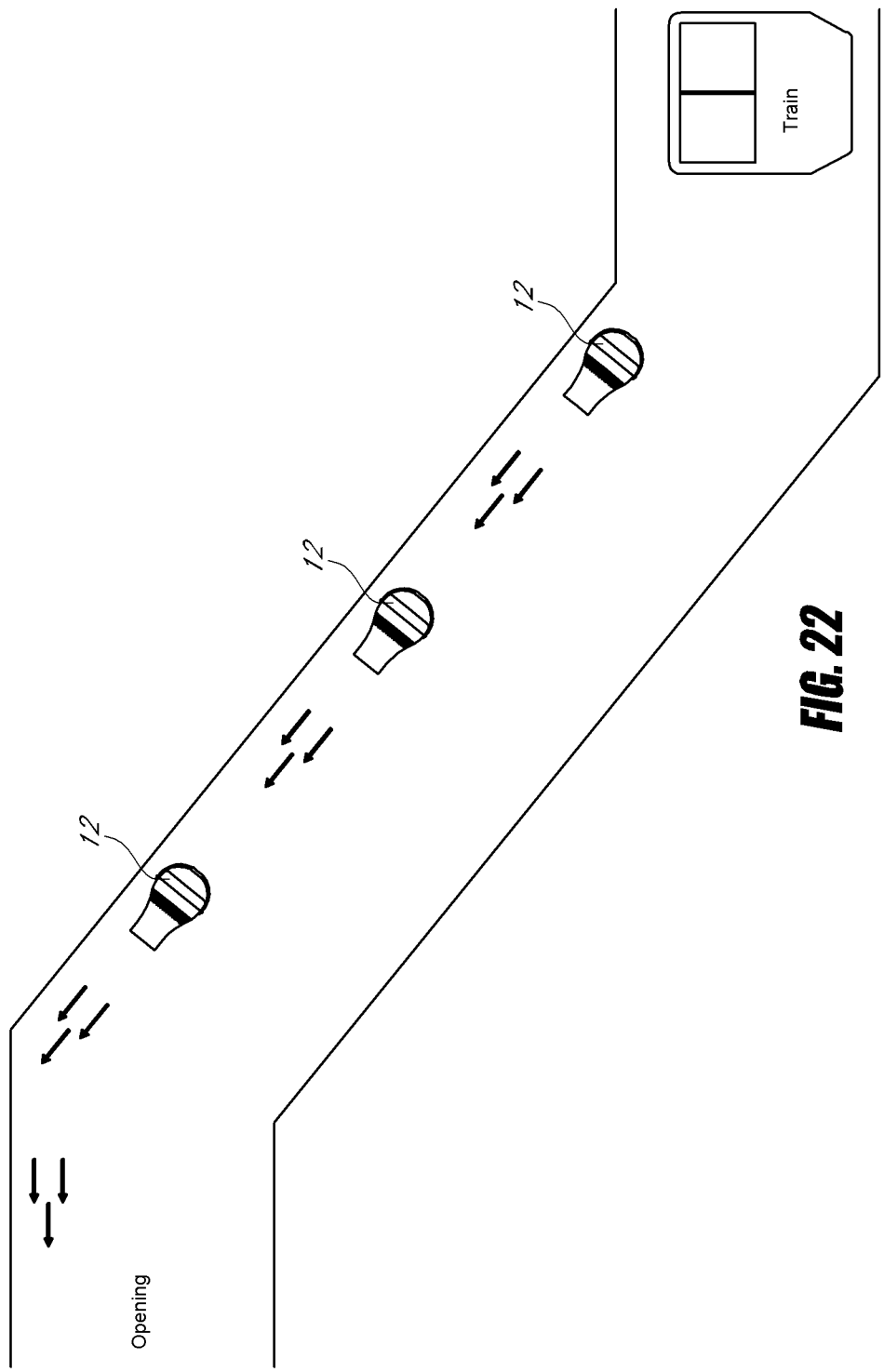
Figure 23:
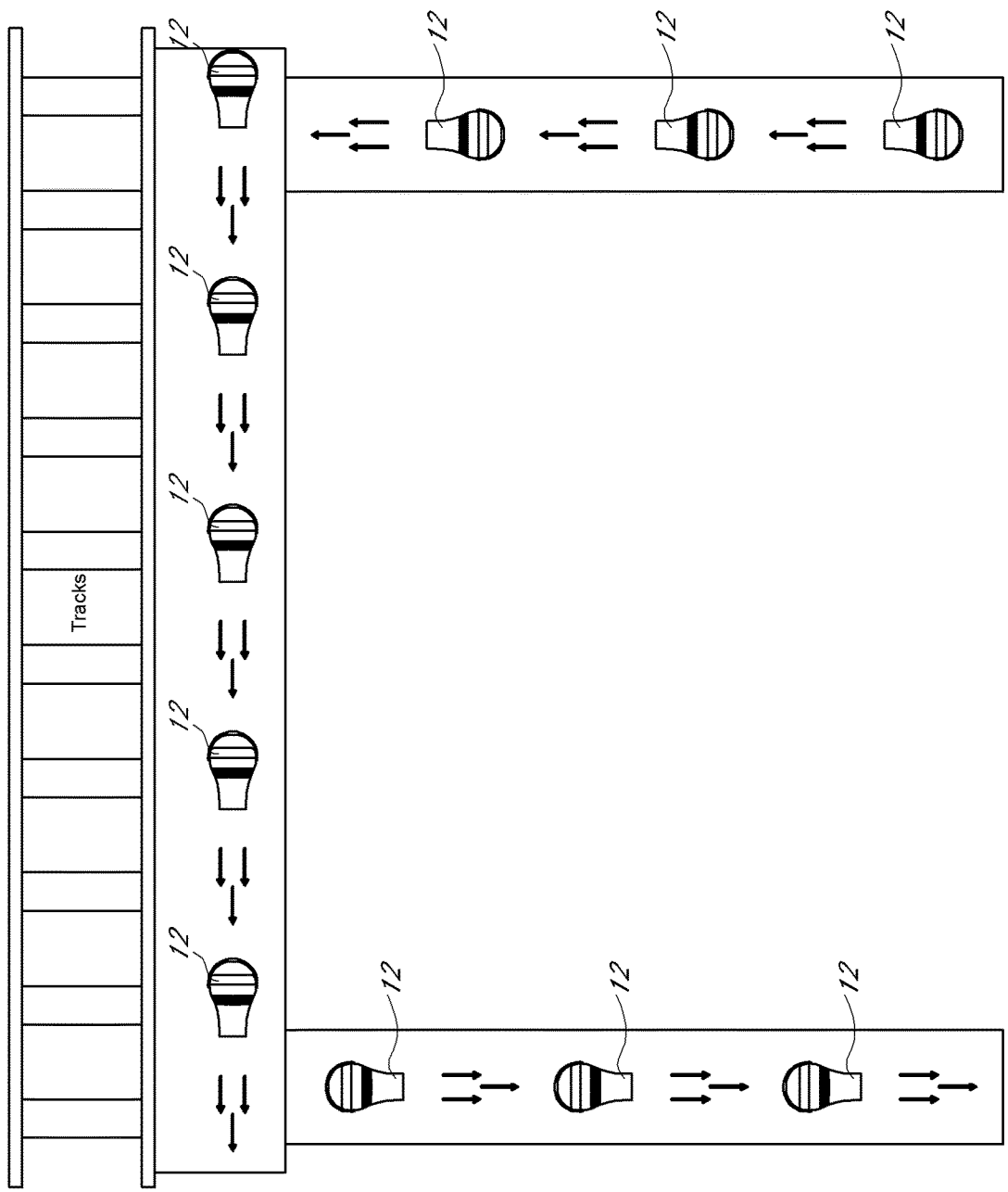

With reference to FIGS. 21-23, in some embodiments a plurality of air moving devices 12 can be arranged, for example, to move cool air from a first location into a second location. For example, cool air can be moved from a street level location to a subway or train station terminal. As illustrated in FIGS. 21-23, the air moving devices 12 can be spaced apart and angled such that a continuous airflow is created within the terminal. The continuous airflow can direct air down from street level towards the platform level of the terminal (see FIGS. 21, 23), then generally parallel to a train or train track along the platform (see FIG. 23), and finally back up from the platform level to the street level again (see FIGS. 22, 23). The air flow devices 12 can work in concert to create the continuous airflow, helping to cool the subway or train station terminal, and/or to eliminate pockets of stale air that have built up within the terminal. This cascading movement of air can especially be useful at night, when the air at the street level is cool, and fresh. During night, when there are fewer people, and the trains are not running, the air moving devices 12 can be operated at high speeds to help quickly cool the terminal area, and then be run at lower speeds during the daytime when the people in the terminal area.

Figure 24:
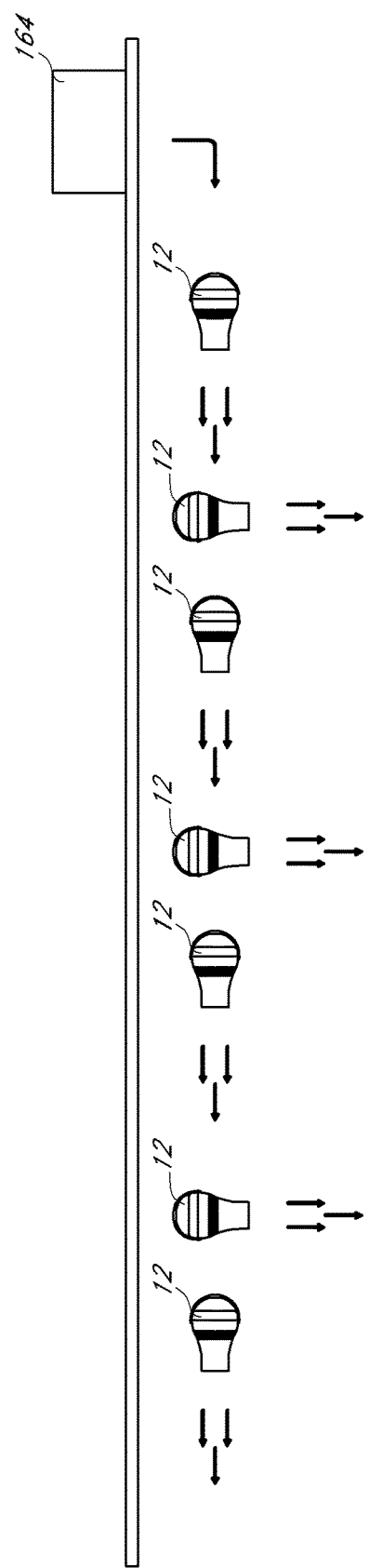

With reference to FIG. 24, in some embodiments a plurality of air moving devices 12 can also be arranged such that some of the air moving devices 12 are angled to direct air in a cascading manner as described above, whereas other air moving devices 12 are angled to direct air downwardly. This arrangement of air moving devices 12 can advantageously be used in commercial areas, such as grocery stores. For example, as illustrated in FIG. 24, air can be directed in through a roof unit 164. Once the air is inside the building (e.g. grocery store), the air moving devices 12 can pick up the air and move it in a cascading manner within the store to cool and/or eliminate pockets of stale air. Some of the air moving devices 12 can be angled so as to direct the air in a downward manner, cooling areas such as aisles or other portions of the store that may need to be cooled. This combination of cascading and downward cooling can help to keep the store as fresh, and comfortable, as possible.

Additionally, moving air laterally and in a cascading manner can advantageously be used where it is not possible to use ductwork to achieve the same purpose, or where ductwork would be too expensive or too large. For example, often the clearance within a commercial or manufacturing building's roof is not suitable for use of ductwork. The ductwork for such buildings can be costly, and can incorporate multiple pipes or other structures which accumulate losses. Ductwork is also often not available for areas in which people are waiting in line (e.g. waiting to get into rides as described above). In some large industrial buildings, manufacturing processes such as blow molding are used. These processes generate large amounts of heat (e.g. in the form of a heat plume) that need to be moved to other areas of the building to prevent electronics in the area (e.g. near the ceiling) from melting and/or otherwise being damaged. In these areas ductwork is also often not appropriate because the runs may be 500 feet or more. The ductwork would need to be very large, and the motors would need to be very large as well in order to move propel the air, resulting in high cost. Additionally, the ceilings of these buildings are often filled with conveyers and other objects that would make such large ductwork unfeasible. Thus, using a plurality of air moving devices 12, which cascade the air as described above, would be advantageous alternatives for ductwork in these and the other structures and setting described above.

Although the present invention has been described with a certain degree of particularity, it is understood that the present disclosure has been made by way of example and that changes in details of structure may be made without departing from the spirit thereof.

What is claimed is:
1. An air moving device comprising:
an outer housing having:
  an inlet;
  an outlet;
  an outer housing axis extending between the inlet and the outlet;
  a cross-section between the inlet and the outlet; and
  an outer housing wall extending between the inlet and the outlet;
an impeller positioned within the outer housing, the impeller having:
  an impeller hub positioned along the outer housing axis and configured to rotate about the outer housing axis, the impeller hub having a first impeller end facing said inlet and a second impeller end facing said outlet, said impeller hub defining an impeller hub diameter at said second impeller end;
  an impeller motor having a diameter such that the impeller motor is positionable within the impeller hub; and
  a plurality of impeller blades extending radially outward from the impeller hub, each of the plurality of impeller blades having a downstream edge; and
a stator assembly positioned within the outer housing between the impeller and the outlet of the outer housing, the stator assembly having:
  an annular stator hub positioned along the outer housing axis, the annular stator hub having a first stator hub end facing said impeller and a second stator hub end facing said outlet, said stator hub defining a stator diameter at said first end approximately equal to the impeller hub diameter; and
  a plurality of stator vanes extending radially outward from the stator hub, each of the plurality of stator vanes having an upstream end and the impeller motor having a downstream end, wherein the downstream end of the impeller motor is upstream of the upstream end of each of the plurality of stator vanes, the downstream edge of the plurality of impeller blades and the upstream end of each of the plurality of stator vanes defining a longitudinal gap having a maximum size of 1.25 inches.

2. The device of claim 1, wherein the stator hub has a circular cross-section.

3. The device of claim 1, comprising a light element positioned within the outer housing downstream of the impeller hub.

4. The device of claim 1, wherein the impeller is connected to both the stator assembly and the outer housing.

5. The device of claim 1, wherein a cross-section of the stator assembly as measured perpendicular to the outer housing axis is greater at the first end of the first stator hub end than at the second stator hub end.

6. The device of claim 1, wherein the impeller motor has a height such that the impeller motor is containable within the impeller hub, and wherein the impeller motor is contained within the impeller hub.

7. An air moving device comprising:
an outer housing having:
  an inlet;
  an outlet;
  an outer housing axis extending between the inlet and the outlet;
  a rounded between the inlet and the outlet; and
  an outer housing wall extending between the inlet and the outlet;

an impeller positioned within the outer housing, the impeller having:
  a first impeller end facing said inlet;
  a second impeller end facing said outlet;
  an impeller hub positioned along the outer housing axis and configured to rotate about the outer housing axis;
  an impeller motor; and
  a plurality of impeller blades extending radially outward from the impeller hub;
a stator assembly positioned within the outer housing between the impeller and the outlet of the outer housing, the stator assembly having:
  a first stator end facing said impeller;
  a second stator end facing said outlet; and
  a plurality of curved stator vanes;
  a stator ring connected to a radially-outward end of one or more of the plurality of curved stator vanes; and
wherein the first stator end and the second stator end are positioned within the outer housing and wherein the stator assembly is removable from the outer housing, wherein the plurality of stator vanes are located downstream from the motor and there is a gap between the plurality of stator vanes and the plurality of impeller blades and wherein the impeller motor is located within the impeller hub.

8. The device of claim 7, wherein the stator assembly is configured to be inserted through the inlet of the outer housing during assembly of the air moving device.

9. The device of claim 7, wherein each of the stator blades are curved near the first end of the stator assembly and straight near the second end of the stator assembly.

10. The device of claim 7, wherein each of the stator blades are curved near the first end of the stator assembly in a direction opposite a direction of rotation of the impeller blades.

11. A method of manufacturing an air moving device comprising providing the air moving device of claim 7 and inserting the stator assembly entirely into the outer housing.

12. The method of claim 11, comprising inserting the stator assembly through the inlet of the outer housing.

13. An air moving device comprising:
  a housing having an inlet, an outlet, a housing axis extending between the inlet and the outlet, and an annular housing wall extending between the inlet and the outlet and defining a housing interior, the housing having a length;
  an impeller assembly positioned at least partially within the housing interior, the impeller assembly comprising:
    an impeller hub having a cross-section measured perpendicular to the housing axis;
    a plurality of impeller blades extending radially outward from the impeller hub with respect to the housing axis; and
    a motor configured to rotate the impeller hub and impeller blades;
  a stator assembly positioned at least partially within the housing interior, the stator assembly comprising:
    an annular stator hub positioned adjacent the impeller hub and having a cross-section substantially equal to the cross-section of the impeller hub as measured perpendicular to the housing axis; and
    a plurality of stator vanes extending radially outward from the annular stator hub, each of the plurality of stator vanes extending a majority of the length of the housing;
  wherein a space between, and wherein the plurality of stator vanes are located downstream from the motor and extend to the outlet and there is a gap between the plurality of stator vanes and the plurality of impeller blades the annular stator hub, the annular housing wall, and the plurality of stator vanes defines a stator flow path through which the stator assembly is configured to direct air from the impeller assembly during operation of the air moving device.

14. The device of claim 13, comprising a downstream hub portion having a first end and a second end, the first end positioned between the second end of the downstream hub portion and the annular stator hub, the first end of the downstream hub portion being adjacent the annular stator hub and having a cross-section substantially identical to the cross-section of the annular stator hub, the second end of the downstream hub portion having a cross-section smaller than the cross-section of the first end of the downstream hub portion.

15. The device of claim 14, wherein the downstream hub portion defines an inner wall of the stator flow path downstream of the annular stator hub.

16. The device of claim 14, comprising a stator ring extending around upstream portions of the stator vanes.

17. The device of claim 16, wherein the stator ring defines a radially-outward wall of the stator flow path at an upstream end of the stator flow path.

18. The device of claim 14, wherein the outer housing converges to the outlet to form a nozzle, and wherein the first end of the downstream hub portion converges to generally follow a curvature of an inside surface of the housing.

19. The device of claim 14, wherein all air entering the inlet of the outer housing is directed through an air passage defined entirely on a radially-inward side by the impeller hub, the annular stator hub, and the downstream hub portion.

20. The device of claim 13, comprising a light element positioned within the housing downstream of the impeller assembly.

* * * * *

UNITED STATES PATENT AND TRADEMARK OFFICE
CERTIFICATE OF CORRECTION

| | | |
|---|---|---|
| PATENT NO. | : 9,631,627 B2 | Page 1 of 1 |
| APPLICATION NO. | : 15/061951 | |
| DATED | : April 25, 2017 | |
| INVENTOR(S) | : Raymond B. Avedon | |

It is certified that error appears in the above-identified patent and that said Letters Patent is hereby corrected as shown below:

In Column 12 at Line 65, in Claim 7, change "rounded" to --cross-section--.

In Column 14 at Lines 14-18, in Claim 13, delete ", and wherein the plurality of stator vanes are located downstream from the motor and extend to the outlet and there is a gap between the plurality of stator vanes and the plurality of impeller blades".

In Column 14 at Line 22, in Claim 13, after "of the air moving device" insert --, and wherein the plurality of stator vanes are located downstream from the motor and extend to the outlet and there is a gap between the plurality of stator vanes and the plurality of impeller blades--.

Signed and Sealed this
Twenty-third Day of May, 2017

Michelle K. Lee
*Director of the United States Patent and Trademark Office*